(12) United States Patent
Matsuda et al.

(10) Patent No.: US 10,367,444 B2
(45) Date of Patent: Jul. 30, 2019

(54) STRUCTURE FOR LAYING SOLAR CELL MODULES, SOLAR CELL MODULE, AND SOLAR CELL MODULE INSTALLATION METHOD

(71) Applicant: Kaneka Corporation, Osaka (JP)

(72) Inventors: Takahiro Matsuda, Hyogo (JP); Tetsuji Otani, Hyogo (JP); Toshifumi Namiuchi, Hyogo (JP); Susumu Fukuda, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 15/977,295

(22) Filed: May 11, 2018

(65) Prior Publication Data

US 2018/0262156 A1 Sep. 13, 2018

Related U.S. Application Data

(63) Continuation of application No. PCT/JP2016/083378, filed on Nov. 10, 2016.

(30) Foreign Application Priority Data

Nov. 13, 2015 (JP) .................................. 2015-223010

(51) Int. Cl.
 *E04F 13/08* (2006.01)
 *H02S 20/22* (2014.01)
 (Continued)

(52) U.S. Cl.
 CPC ............ *H02S 20/22* (2014.12); *E04F 13/081* (2013.01); *H02S 20/26* (2014.12); *H02S 40/34* (2014.12); *E04F 13/0864* (2013.01); *Y02B 10/10* (2013.01)

(58) Field of Classification Search
 CPC .......... H02S 20/22; H02S 40/34; E04F 13/08
 (Continued)

(56) References Cited

U.S. PATENT DOCUMENTS

| 5,951,785 A * | 9/1999 | Uchihashi ............. H01L 31/048 136/251 |
| 6,342,669 B1 | 1/2002 | Sakai et al. |

(Continued)

FOREIGN PATENT DOCUMENTS

| JP | 2001-036125 A | 2/2001 |
| JP | 2002-190611 A | 7/2002 |

(Continued)

OTHER PUBLICATIONS

International Search Report issued in International Application No. PCT/JP2016/083378, dated Dec. 27, 2016 (2 pages).

(Continued)

*Primary Examiner* — Paola Agudelo
(74) *Attorney, Agent, or Firm* — Osha Liang LLP

(57) ABSTRACT

A solar cell module laying system is configured to lay a plurality of solar cell modules on a wall surface rising in a substantially vertical direction. The plurality of solar cell modules includes a first solar cell module and a second solar cell module adjacent to each other, and the two adjacent solar cell modules have an overlapping region. The terminal box is disposed between the two adjacent solar cell modules and in the overlapping region, and a configuration satisfies the following condition (1) or (2).
 (1) A part of the terminal box is exposed toward an outside of a gap.
 (2) A part of the gap is closed by a member, the member can be attached to and removed from the gap, and a part of the terminal box is exposed toward the outside of the gap when the member is removed from the gap.

13 Claims, 22 Drawing Sheets

(51) Int. Cl.
    *H02S 40/34*     (2014.01)
    *H02S 20/26*     (2014.01)
(58) Field of Classification Search
    USPC .......................................................... 52/706
    See application file for complete search history.

(56) References Cited

U.S. PATENT DOCUMENTS

| | | | | |
|---|---|---|---|---|
| 7,635,810 | B2* | 12/2009 | Luch ................ | H01L 31/0392 |
| | | | | 136/244 |
| 10,084,104 | B2* | 9/2018 | Morad ............... | H01L 31/0504 |
| 2004/0221886 | A1* | 11/2004 | Oono ................. | H02S 20/25 |
| | | | | 136/251 |
| 2010/0136748 | A1* | 6/2010 | Autry ................ | H01L 23/051 |
| | | | | 438/121 |
| 2010/0218799 | A1* | 9/2010 | Stefani .............. | H01L 31/0201 |
| | | | | 136/244 |
| 2010/0254010 | A1* | 10/2010 | Whitehead ........ | G02B 17/061 |
| | | | | 359/597 |
| 2011/0005583 | A1* | 1/2011 | Thomas ............. | H02S 30/20 |
| | | | | 136/252 |
| 2011/0283635 | A1* | 11/2011 | Sato ................... | E04F 13/0807 |
| | | | | 52/173.3 |
| 2012/0118359 | A1* | 5/2012 | Battistutti ........... | E06B 9/264 |
| | | | | 136/251 |
| 2015/0340527 | A1* | 11/2015 | Motonaga ......... | H01L 31/0504 |
| | | | | 136/251 |
| 2015/0349175 | A1* | 12/2015 | Morad ............... | H01L 31/0508 |
| | | | | 136/251 |

FOREIGN PATENT DOCUMENTS

| | | |
|---|---|---|
| JP | 2002-373997 A | 12/2002 |
| JP | 2004-027734 A | 1/2004 |
| JP | 2006-265856 A | 10/2006 |
| JP | 2010-90701 A | 4/2010 |
| JP | 2013-026407 A | 2/2013 |

OTHER PUBLICATIONS

International Preliminary Report on Patentability issued in International Application No. PCT/JP2016/083378; dated May 15, 2018 (9 pages).

* cited by examiner

A-A SECTIONAL VIEW

B-B SECTIONAL VIEW

FIG. 15A
FIG. 15B
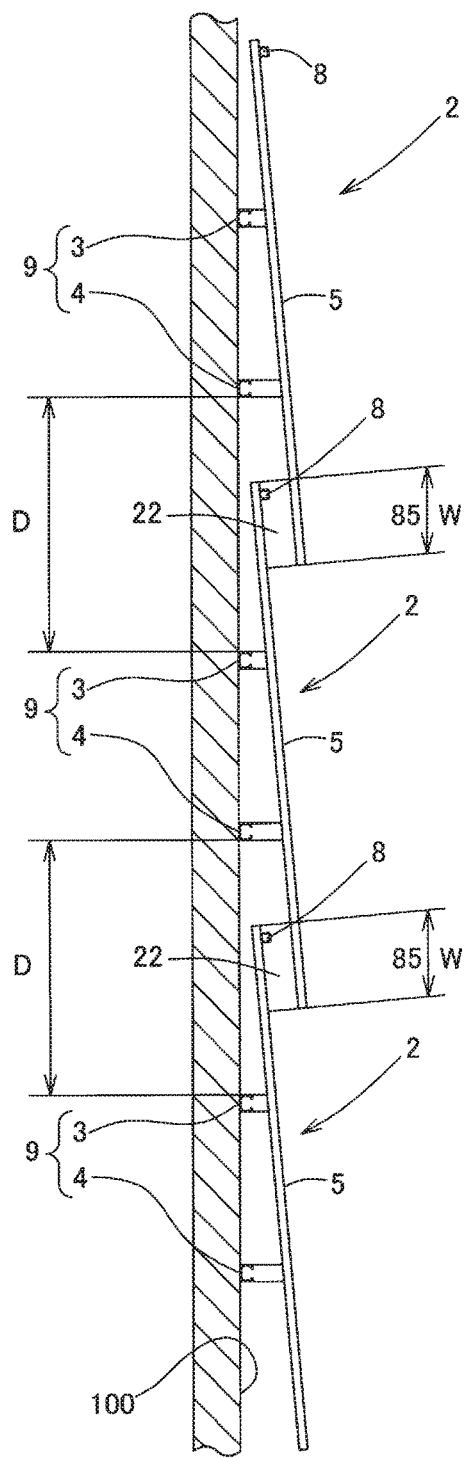
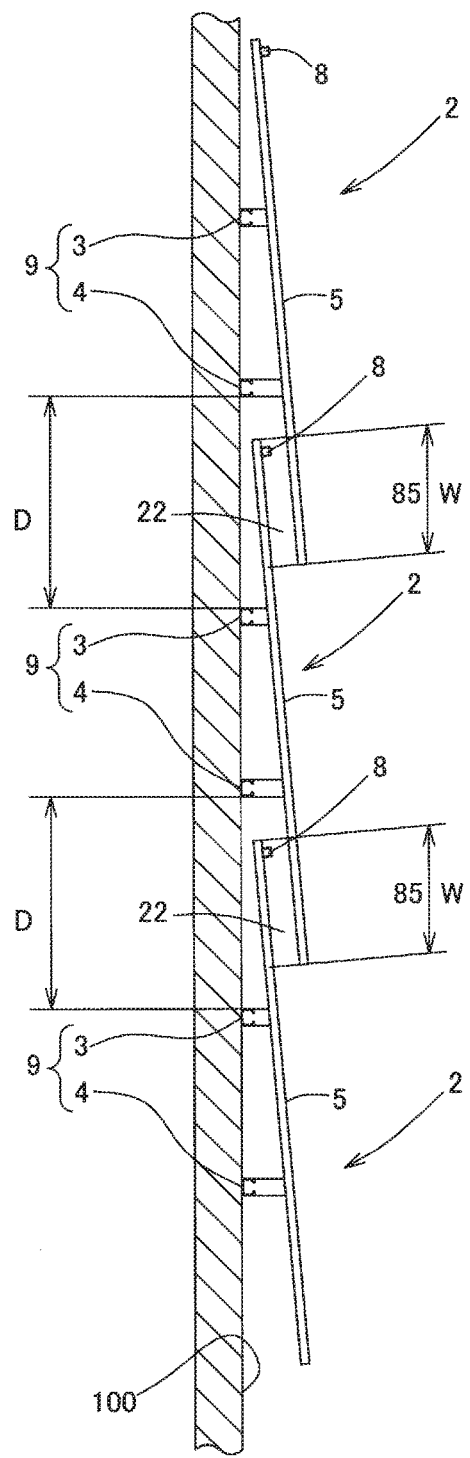

STRUCTURE FOR LAYING SOLAR CELL MODULES, SOLAR CELL MODULE, AND SOLAR CELL MODULE INSTALLATION METHOD

TECHNICAL FIELD

One or more embodiments of the present invention relate to a solar cell module laying structure for laying a solar cell module on a wall surface of a veranda or balcony, building, or the like. One or more embodiments of the present invention also relate to a solar cell module adoptable for a solar cell module laying structure. One or more embodiments of the present invention further relate to a solar cell module installation method when installing the solar cell module on the wall surface.

BACKGROUND

Conventionally, installation of solar cell modules in general houses is mainly performed by installing high power modules on a roof, in view of a large amount of solar radiation and easy reception of light.

However, since an installation area of the solar cell modules on the roof is very limited, a new installation place of a solar cell module has been sought in recent years. Accordingly, it has been proposed to install a solar cell module on a wall surface of a veranda or balcony, wall, or the like as a possibility of an installation place of the solar cell module (e.g., Patent Document 1).

In an installation structure of an exterior wall decorative material described in Patent Document 1, a plurality of solar panels are mounted to be parallel to a wall surface, and these solar panels are used as an exterior wall decorative material.

PRIOR ART DOCUMENTS

Patent Documents

Patent Document 1: JP 2010-90701 A

The installation structure of an exterior wall decorative material described in Patent Document 1 is provided with a terminal box and a connection wiring line on a back surface of the solar panel, and installed such that light receiving surfaces of the plurality of solar panels form one substantially flat surface. Therefore, it is necessary to provide a work space for performing maintenance work on a rear side of the solar panel.

However, providing the work space on the rear side causes separation from the wall surface, forming a step between the installation part and other part. That is, while being apart from the wall surface, the solar panel is fixed to a metal fixture such as a runner, and there is no sense of unity between the installation part and a part other than the installation part, which may possibly greatly impair a design characteristic of the entire wall surface.

Further, in the installation structure of an exterior wall decorative material described in Patent Document 1, when a solar panel is directly installed on the wall surface without providing a work space, the step between the installation part of the solar panel and other part becomes small, and a sense of unity with a part other than the installation part can be generated. However, when performing maintenance work, it is necessary to assure the work space by removing the solar panel from the wall surface, which may lead to maintenance work that becomes troublesome.

Meanwhile, in the installation structure of an exterior wall decorative material described in Patent Document 1, a measure to cover the entire wall surface with solar panels is described as a measure to give a sense of unity to the wall surface. However, the wall surface for installation does not always have the same size. For that reason, in order to conduct installation to a desired installation range (the entire wall surface), it is necessary to spread solar panels having a size to fit on the installation range.

Conversely speaking, the installation structure for the exterior material described in Patent Document 1 has its own installation range on the wall surface because the structure uses a solar panel having a size determined by its specification. Therefore, the solar panels cannot be installed for various installation ranges.

If the specification of the solar panel to be installed does not match the installation range, the size of the solar panel does not fit exactly within the installation range, which may possibly forms an unnecessary gap. That is, around the gap part, a step is formed between the installation part and other part, which may possibly greatly impair a design characteristic of the entire wall surface.

Accordingly, one or more embodiments of the present invention provide a solar cell module laying structure and a solar cell module in which a terminal box is provided, the design characteristic is not impaired by the presence of the terminal box, and the terminal box can be easily maintained. One or more embodiments of the present invention provide a solar cell module installation method capable of laying a solar cell module according to a desired range.

SUMMARY

One or more embodiments of the present invention may be a solar cell module laying structure (or "solar cell module laying system") configured to lay a plurality of solar cell modules on a wall surface rising in a substantially vertical direction, wherein the plurality of solar cell modules includes a first solar cell module and a second solar cell module adjacent to each other with an overlapping part (or "overlapping region"), wherein each of the solar cell modules has a terminal box, most of the terminal box being disposed in the overlapping part and in a gap between the first and second solar cell modules, and wherein a condition (1) or (2) below is satisfied:

(1) a part of the terminal box is exposed toward an outside of the gap, and (2) a part of the gap is blocked by another member that is attachable to and detachable from the gap, the part of the terminal box being exposed toward the outside of the gap when the another member is detached from the gap.

The term "overlapping part" as used herein refers to a part where adjacent solar cell modules overlap each other when one solar cell module in the adjacent solar cell modules is viewed from the front.

The term "most of" as used herein means a range of 80% or more of the entire reference object. That is, the "most of the terminal box" means a part of 80% or more of the entire terminal box.

The term "substantially vertical direction" as used herein includes not only a vertical direction (a direction at 90 degrees to a horizontal plane) but also a direction slightly inclined with respect to the vertical direction. Specifically, in the "substantially vertical direction", inclination within a range of ±5 degrees with respect to the vertical direction is allowed.

According to this aspect, the terminal box is disposed in the gap between adjacent solar cell modules and in the overlapping part. That is, in the adjacent solar cell modules, the terminal box is disposed at or near an end of one solar cell module. Therefore, the terminal box is externally covered by the presence of another one of the solar cell modules in an overlapping direction (a direction in which the solar cell modules overlap each other), so that the terminal box is hard to see, and only the solar cell module seems to be installed when the wall surface is viewed from the front. Therefore, a high design characteristic is achieved.

According to this aspect, a part of the terminal box is exposed from the gap between adjacent solar cell modules, or a part of the terminal box can be exposed from the gap between adjacent solar cell modules by removing another member. Therefore, maintenance work of the terminal box can be performed from an extending direction of the light receiving surface (a direction crossing an orthogonal direction to the light receiving surface) of one of the solar cell modules. That is, maintenance work and the like can be performed with the solar cell module laid, without removing the terminal box.

According to this aspect, since the maintenance work of the terminal box can be performed from the extending direction of the light receiving surface of one of the solar cell modules, the maintenance space on the rear side can be omitted, and a distance between the wall surface and the solar cell module can be made close to each other. Therefore, it is possible to reduce the step generated between the solar cell module and the wall surface, thereby providing a solar cell module laying structure with a high design characteristic.

In one or more embodiments of the above invention, a part of the terminal box may be externally exposed in an arrangement direction of the two solar cell modules.

In one or more embodiments, the first and second solar cell modules are inclined with respect to the wall surface and overlap with each other when the wall surface is viewed from front.

According to this aspect, since adjacent solar cell modules are inclined with respect to the wall surface and overlap each other in a perpendicular direction with respect to the wall surface, light such as sunlight can be easily received, power generation efficiency can be improved, and a laying area can be reduced as compared with the prior art.

In one or more embodiments, each of the solar cell modules has an upper side and a lower side opposing to each other, and a region along a lower side of the first solar cell module overlaps with a region along an upper side of the second solar cell module.

According to this aspect, since adjacent solar cell modules overlap each other in an up-down direction and overlap along a side, the light receiving part of the solar cell module is not locally narrowed, suppressing a trouble such as occurrence of a local hot spot.

In one or more embodiments, each of the solar cell modules has a power-generatable region capable of converting light energy into electric energy, and the overlapping part overlaps with a power-generatable region of the second solar cell module located nearer the wall surface than the first solar cell module.

According to this aspect, since a solar cell module on an incident side is arranged to overlap with the power-generatable region of the solar cell module on the wall surface side, alignment of each solar cell module is easy in laying the solar cell modules.

Meanwhile, according to this aspect, the overlapping part between two adjacent solar cell modules overlaps with the power-generatable region of the solar cell module on the wall surface side with the wall surface as a reference. That is, when light enters in a direction crossing the light receiving surface of the solar cell module, a shadow of the solar cell module on the incident side is likely to overlap with the power-generatable region of the solar cell module on the wall surface side. Therefore, when a normal solar cell module is used, there is a concern that it is difficult to generate power in the overlapping part, and a hot spot is easy to occur.

Therefore, in one or more embodiments, each of the solar cell modules may include a plurality of solar cell groups each including one or more solar cells that are electrically connected in series in the power-generatable region, a plurality of solar cell groups of the second solar cell module includes: a first solar cell group located in the overlapping part; and a second solar cell group composed of the other solar cell group, and the second solar cell module electrically connects the first solar cell group to the second solar cell group in parallel.

According to this aspect, in the solar cell module on the wall surface side, a solar cell group located at the overlapping part is electrically connected in parallel to other solar cell groups. That is, the solar cell module on the wall surface side is formed with a circuit bypassing the overlapping part, so that it is possible to prevent a decrease in output due to a shadow of solar cell module on a light shielding side, and prevent occurrence of a hot spot. Further, even if the solar cell in the overlapping part is short-circuited in the solar cell module on the wall surface side, a closed circuit can be formed by other solar cell groups, making it possible to prevent a short circuit of the entire solar cell module on the wall surface side.

In one or more embodiments, each of the solar cell modules includes a solar cell group including a plurality of solar cells that are electrically connected in series in the power-generatable region, each of the solar cells includes two electrode layers and a photoelectric conversion part interposed between the two electrode layers, and an electrode layer of one of the solar cells is electrically connected in series with another of the solar cells by directly contacting with an electrode layer of the another of the solar cells.

According to this aspect, since the plurality of solar cells are electrically connected in series via the electrode layer, there is no need to newly connect a wiring line or the like, which can improve workability and reduce material cost.

In one or more embodiments, each of the solar cells includes two electrode layers and a photoelectric conversion part interposed between the two electrode layers, the solar cell group includes a first solar cell group located in the overlapping part and a second solar cell group composed of the other solar cell group, and wherein the first solar cell group is electrically connected in parallel to the second solar cell group via a common electrode layer.

According to this aspect, since the solar cell groups are electrically connected in parallel via the common electrode layer, there is no need to newly connect a wiring line or the like, which can improve workability and reduce material cost.

In one or more embodiments, a fixing member fixes the solar cell modules to the wall surface, wherein an end of the first solar cell module has a free end fixed by the fixing member; and wherein a part of the second solar cell module enters between the free end of the first solar cell module and the wall surface to form the overlapping part.

According to this aspect, the solar cell module is fixed by the fixing member, the end of the solar cell module is a free end, and at least an end of the other one of the solar cell modules is inserted into a gap between the end of the one of the solar cell modules and the wall surface. Therefore, it is easy to form the overlapping part between adjacent solar cell modules.

In one or more embodiments, the first and second solar cell modules are inclined with respect to the wall surface, the terminal box has a casing and a cable member, the casing includes: an opening that communicates an internal space of the casing with an outside; and an opening/closing member that can open and close the opening, the opening is directed in an inclination direction of one of the first and second solar cell modules, and a part of the cable member is housed in the internal space of the casing and is exposed toward the outside of the opening when the opening is opened.

According to this aspect, it is easy to check for disconnection of the cable member, a short circuit of a solar cell panel, and the like.

In the above-described aspect, two adjacent solar cell modules may be inclined with respect to the wall surface to be substantially parallel.

The term "substantially parallel" as used herein refers not only to a state of being perfectly parallel (e.g., the inclination angles with respect to the wall surface are the same), but also includes a state slightly inclined from the state being perfectly parallel (e.g., difference of the inclination angles with respect to the wall surface is within 3 degrees).

In one or more embodiments, each of the solar cell modules has a lower side, and has a power-generatable region capable of converting light energy into electric energy, and the second solar cell module overlapping with the overlapping part nearer the wall surface than the first solar cell module has the power-generatable region arranged in a state shifted toward the lower side to avoid an arrangement onto the overlapping part.

According to this aspect, since the power-generatable region of the solar cell module on the wall surface side is arranged to be shifted so as to avoid the overlapping part, a hot spot is difficult to occur, providing high safety and high reliability.

One or more embodiments of the present invention may be a solar cell module that is laid to be inclined with respect to a wall surface rising in a substantially vertical direction, and that has an overlapping part with another solar cell module, the solar cell module including: a light receiving surface; and a terminal box, wherein most of the terminal box is disposed in a gap between the solar cell module and the another solar cell module in the overlapping part, wherein the terminal box includes a casing and a cable member, wherein the casing includes: an opening that communicates an internal space of the casing with an outside; and an opening/closing member that can open and close the opening, wherein the opening is directed in a direction crossing an orthogonal direction to the light receiving surface, and wherein a part of the cable member is housed in the internal space of the casing, the cable member being exposed to an outside of the opening when the opening is opened.

According to this aspect, the terminal box is difficult to see when the wall surface is viewed from the front, achieving a high design characteristic.

According to this aspect, maintenance work and the like can be performed with the solar cell module laid, without removing the terminal box.

The opening may be directed in the inclination direction.

According to this aspect, it is easy to check for disconnection of the cable member, a short circuit of a solar cell panel, and the like.

One or more embodiments of the present invention may be a solar cell module laying method for laying a plurality of solar cell modules in a predetermined area on a wall surface rising in a substantially vertical direction and for arranging the solar cell modules side by side with an overlapping part between adjacent two of the plurality of solar cell modules, the solar cell module laying method including: adjusting a width of the overlapping part based on a width or a height of the predetermined area of the wall surface to lay each of the plurality of solar cell modules in an entire area of the predetermined area.

According to this aspect, adjusting the width of the overlapping part allows the solar cell modules to be spread to be within the predetermined range. Therefore, even if one type of standardized panel is used, it is possible to install solar cell modules with dimensions suitable for various wall surfaces. For example, even when it is desired to install solar cell modules over the entire wall surface, it is possible to install the solar cell modules substantially without any gap in the width direction or the height direction.

One or more embodiments of the present invention include a solar cell module laying method for laying the solar cell modules side by side in a substantially vertical direction with an overlapping part between adjacent two of the solar cell modules, the solar cell module laying method including: adjusting a width of the overlapping part based on a height of the predetermined area of the wall surface to lay each of the solar cell module in an entire area of the predetermined area.

According to this aspect, solar cell modules can be spread to be within a predetermined range.

According to the solar cell module laying structure and the solar cell module of one or more embodiments of the present invention, the terminal box is concealed by the solar cell module, and the design characteristic is not impaired by the presence of the terminal box. In addition, maintenance of the terminal box can be performed while the solar cell module is installed.

According to the solar cell module installation method of one or more embodiments of the present invention, the solar cell module can be laid in accordance with a desired range.

BRIEF DESCRIPTION OF DRAWINGS

FIGS. 9A and 9B are explanatory views of a solar cell panel of FIG. 8, wherein FIG. 9A is an A-A sectional view of FIG. 8, and FIG. 9B is a B-B sectional view of FIG. 8.

FIGS. 14A to 14C are perspective views of a construction step of the solar cell module laying structure of FIG. 1, wherein FIG. 14A is a view showing an installation area, FIG. 14B is a view in which the rail member is laid in the installation area of FIG. 14A, and FIG. 14C is a view of spreading the solar cell modules on the rail member of FIG. 14B.

FIGS. 15A and 15B are explanatory views of adjusting an overlapped width between solar cell modules, wherein FIG. 15A is a sectional view when the overlapped width is reduced, and FIG. 15B is a sectional view when the overlapped width is increased.

FIGS. 25A to 25C are sectional views of a solar cell panel according to one or more embodiments of the present invention, wherein FIGS. 25A to 25C represent respective embodiments.

DETAILED DESCRIPTION OF THE EMBODIMENTS

Hereinafter, one or more embodiments of the present invention will be described in detail.

Figure 1:
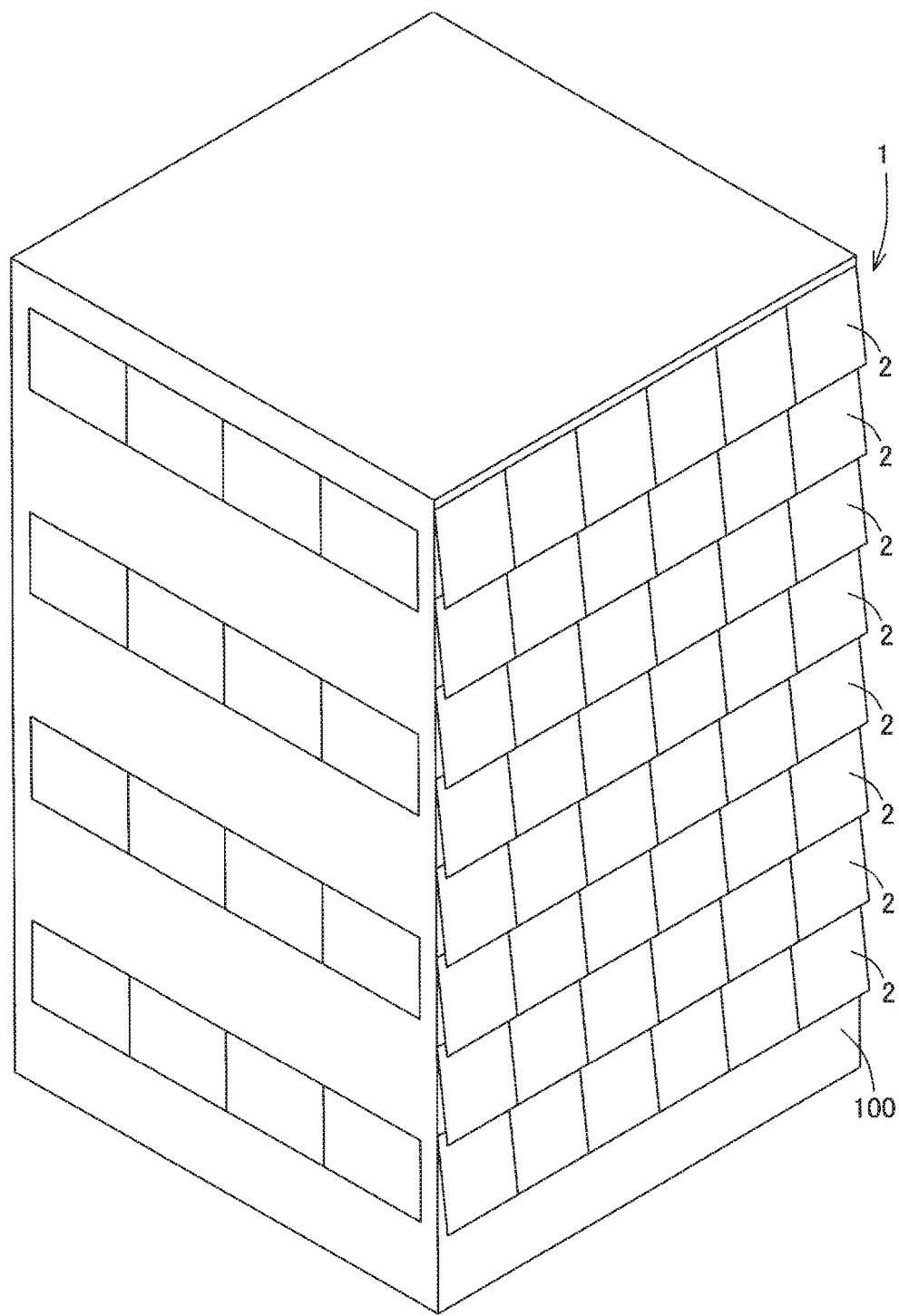
FIG. 1 is a perspective view schematically showing an installed state of a solar cell module laying structure according to one or more embodiments of the present invention.

As shown in FIG. 1, a solar cell module laying structure 1 (hereinafter simply referred to as a laying structure 1) according to one or more embodiments of the present invention is that a plurality of solar cell modules 2 are laid on a wall surface 100, such as a wall surface of a building, rising in a vertical direction with respect to a ground.

Figure 2:
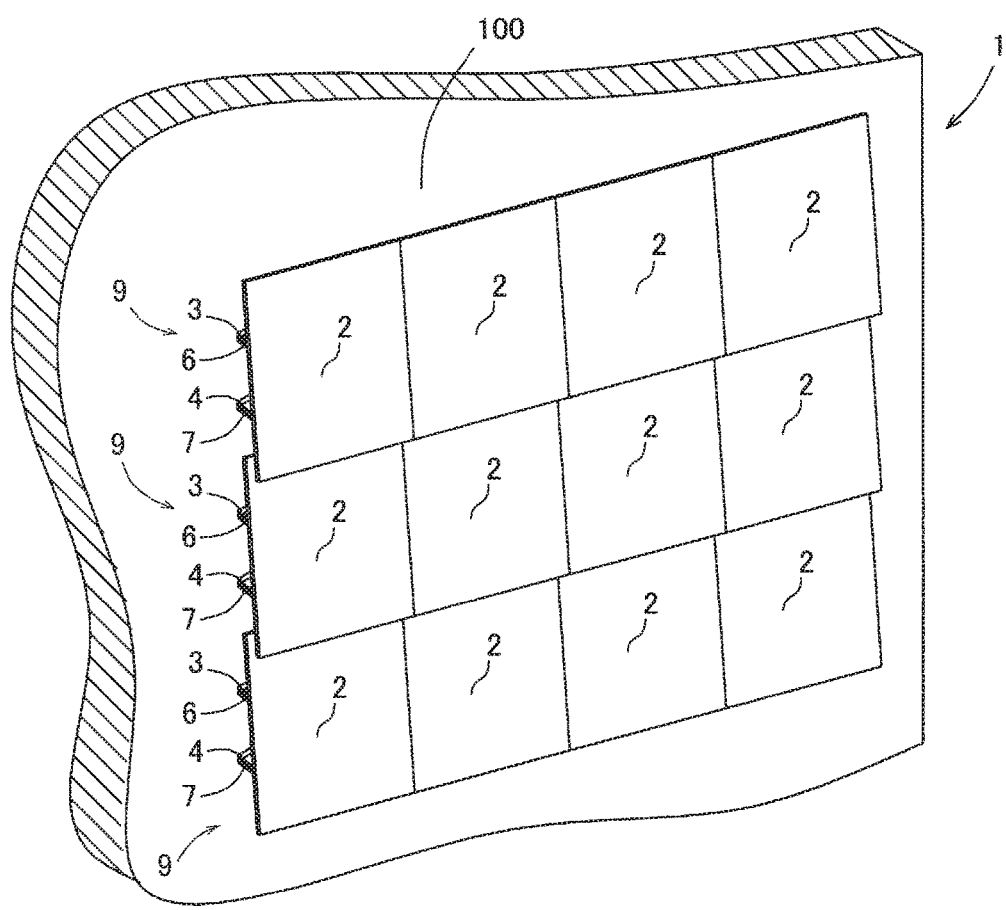
FIG. 2 is a perspective view of the solar cell module laying structure of FIG. 1.
Figure 3:
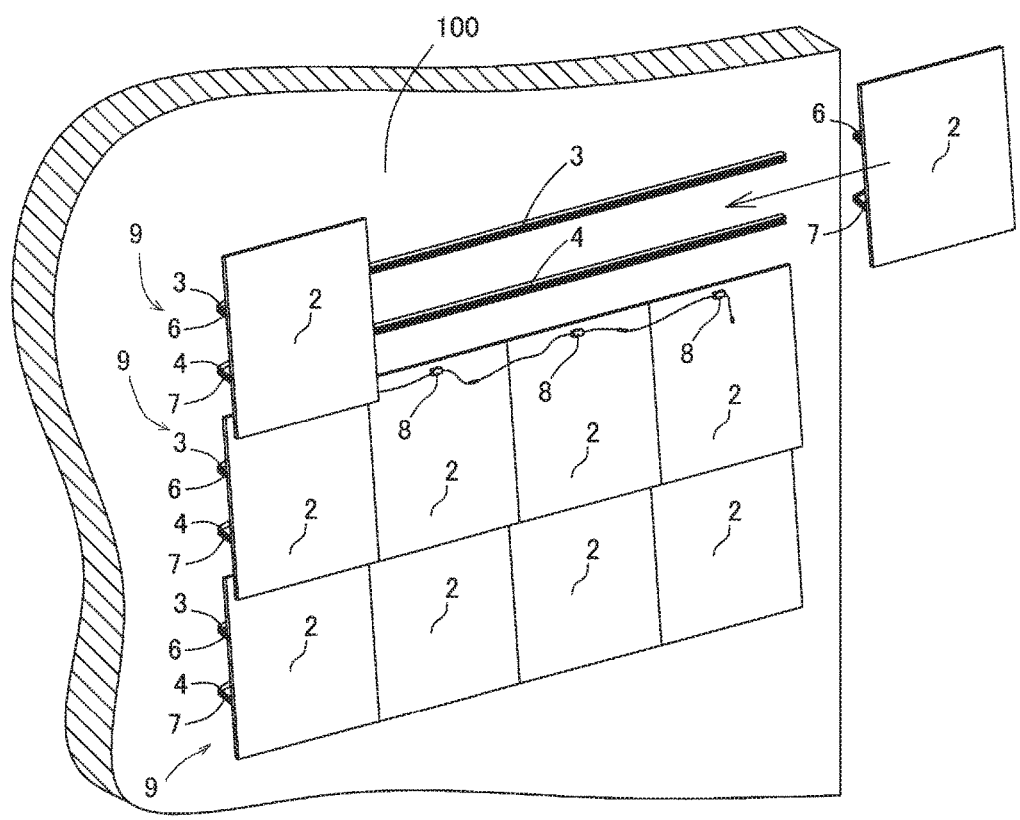
FIG. 3 is an exploded perspective view of the solar cell module laying structure of FIG. 2.

As can be seen from FIGS. 2 and 3, the laying structure 1 includes the plurality of solar cell modules 2, and a plurality of rail groups 9 formed by a pair of rail members 3 and 4 (fixing members).

Figure 6:
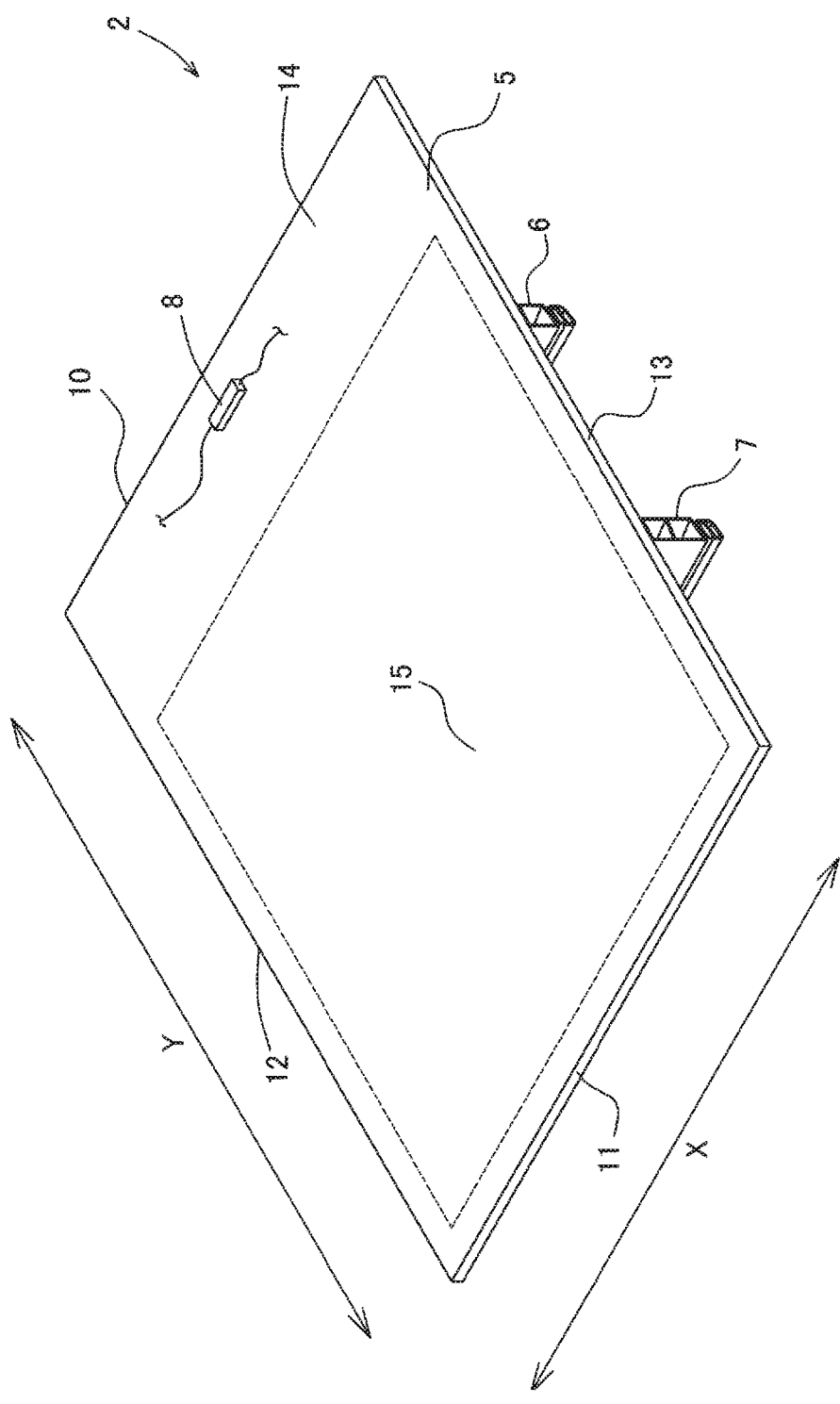
FIG. 6 is a perspective view of a solar cell module of FIG. 3.

As shown in FIG. 6, the solar cell module 2 includes a solar cell panel 5, connecting members 6 and 7, and a terminal box 8, as main component members.

The solar cell panel 5 is a plate-shape panel having a planar extension, and is a polygonal panel. The solar cell panel 5 of one or more embodiments is a quadrangular panel, and includes lateral sides 10 and 11 opposing each other in a longitudinal direction Y, and longitudinal sides 12 and 13 connecting these lateral sides 10 and 11 and opposing each other in a lateral direction X. The lateral sides 10 and 11 are sides extending in the lateral direction X, and the longitudinal sides 12 and 13 are sides extending in the longitudinal direction Y.

The solar cell panel 5 has a power-generatable region 15 capable of converting light energy into electric energy.

The power-generatable region 15 is a region constituting a light receiving surface 14 and occupying most of the solar cell panel 5. The power-generatable region 15 of the present embodiment is a quadrangular region, occupying 70% or more of a total area of the solar cell panel 5 when a surface on the light receiving surface 14 side is viewed from the front.

Figure 8:
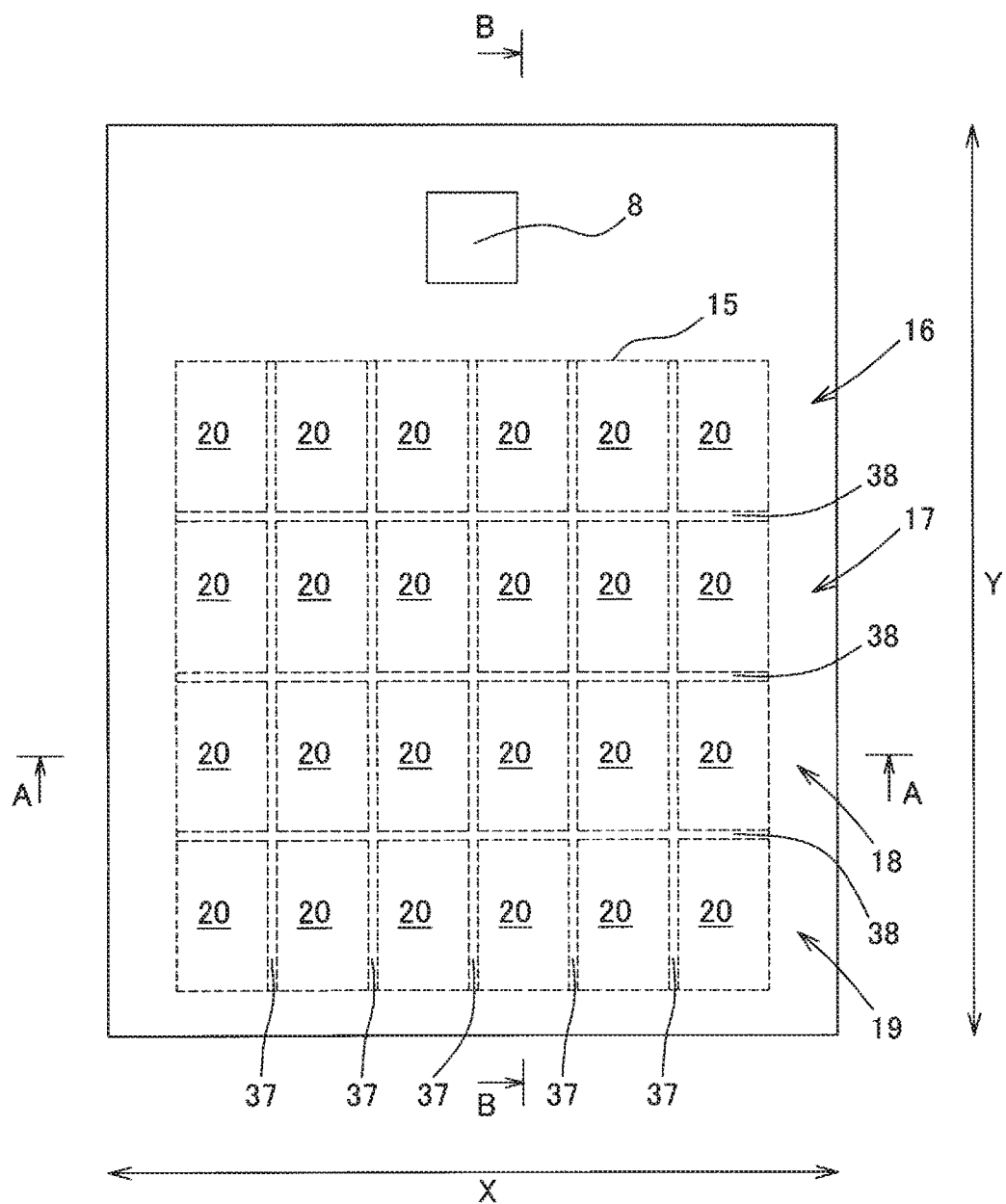
FIG. 8 is a plan view of the solar cell module of FIG. 6.
Figure 9A:
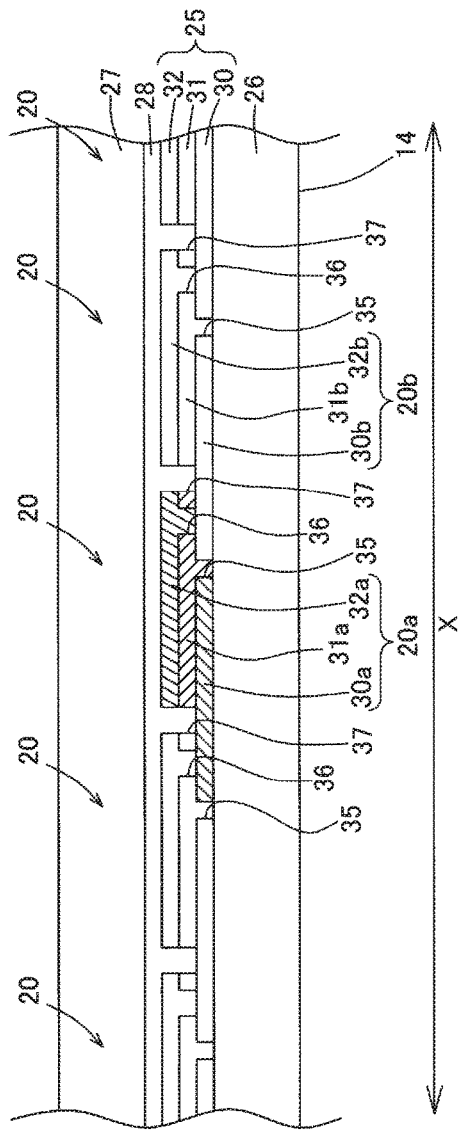
Figure 9B:
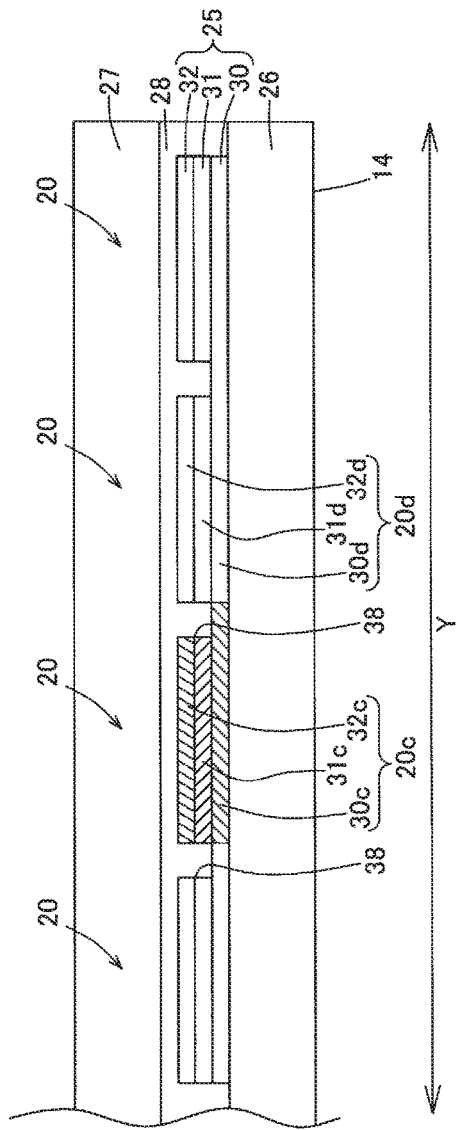

As can be seen from FIGS. 8, 9A, and 9B, the power-generatable region 15 of the solar cell panel 5 is provided with solar cell strings 16, 17, 18, and 19 (solar cell group) in which a plurality of solar cells 20 are connected.

Paying attention to an internal structure around the power-generatable region 15 of the solar cell panel 5, as shown in FIGS. 9A and 9B, in the solar cell panel 5, a photoelectric conversion element 25 is interposed between two glass substrates 26 and 27, and a gap between the glass substrates 26 and 27 is filled with a sealing member 28.

The solar cell panel 5 of the present embodiment is a thin film solar cell panel in which the photoelectric conversion element 25 is laminated on the glass substrate 26. That is, one glass substrate 26 is a supporting substrate that supports the photoelectric conversion element 25 and is also a sealing substrate, while the other glass substrate 27 is a sealing substrate that seals the photoelectric conversion element 25 together with the glass substrate 26.

In the photoelectric conversion element 25, a photoelectric conversion layer 31 is interposed between two electrode layers 30 and 32.

One electrode layer 30 is an electrode layer formed on the light receiving surface 14 side, and is a transparent electrode layer formed of a transparent conductive layer. As the electrode layer 30, for example, a transparent conductive oxide such as indium tin oxide (ITO) can be used.

The other electrode layer 32 is a back surface electrode layer formed on a rear side (a side opposite to the light receiving surface 14), and is a metal electrode layer formed of a metal layer. As the electrode layer 32, for example, it can be formed of a metal such as aluminum, or formed by a multilayer structure of a transparent conductive oxide layer and a metal layer.

The photoelectric conversion layer 31 includes at least a p-type semiconductor layer and an n-type semiconductor layer, and is provided with a PN junction or a PIN junction.

Paying attention to the lateral direction X of the power-generatable region 15, as shown in FIG. 9A, the solar cell panel 5 includes a first electrode layer separation groove 35 that separates the first electrode layer 30, an electrode connection groove 36 that separates the photoelectric conversion layer 31, and an element separation groove 37 that separates both the photoelectric conversion layer 31 and a second electrode layer 32.

The first electrode layer separation groove 35 is a groove that separates the photoelectric conversion element 25 into the plurality of solar cells 20. The first electrode layer separation groove 35 has the glass substrate 26 as a bottom part, and is filled with the photoelectric conversion layer 31. That is, the photoelectric conversion layer 31 enters the first electrode layer separation groove 35, and the glass substrate 26 and the photoelectric conversion layer 31 are in direct contact with each other.

As shown in FIG. 9A, the electrode connection groove 36 is a groove that connects between the electrode layers 31a and 30b of the adjacent solar cells 20a and 20b. The electrode connection groove 36 has the first electrode layer 30b of another solar cell 20b as a bottom part, and is filled with a second electrode layer 32a. That is, the second electrode layer 32a enters the electrode connection groove 36, and the second electrode layer 32a of one solar cell 20a is in direct contact with the first electrode layer 30b of the another solar cell 20b. In other words, the second electrode layer 32a and the first electrode layer 30b of the adjacent solar cell 20a and 20b are electrically connected via the electrode connection groove 36.

The element separation groove 37 is a groove that separates the photoelectric conversion element 25 into the plurality of solar cells 20, together with the first electrode layer separation groove 35. The element separation groove 37 has the first electrode layer 30 as a bottom part, and is filled with the sealing member 28.

In the solar cells 20a and 20b adjacent in the lateral direction X, the second electrode layer 32a of one solar cell 20a is electrically connected to the first electrode layer 30b of the other solar cell 20b. That is, the solar cells 20a and 20b adjacent in the lateral direction X are electrically connected in series.

Figure 10:
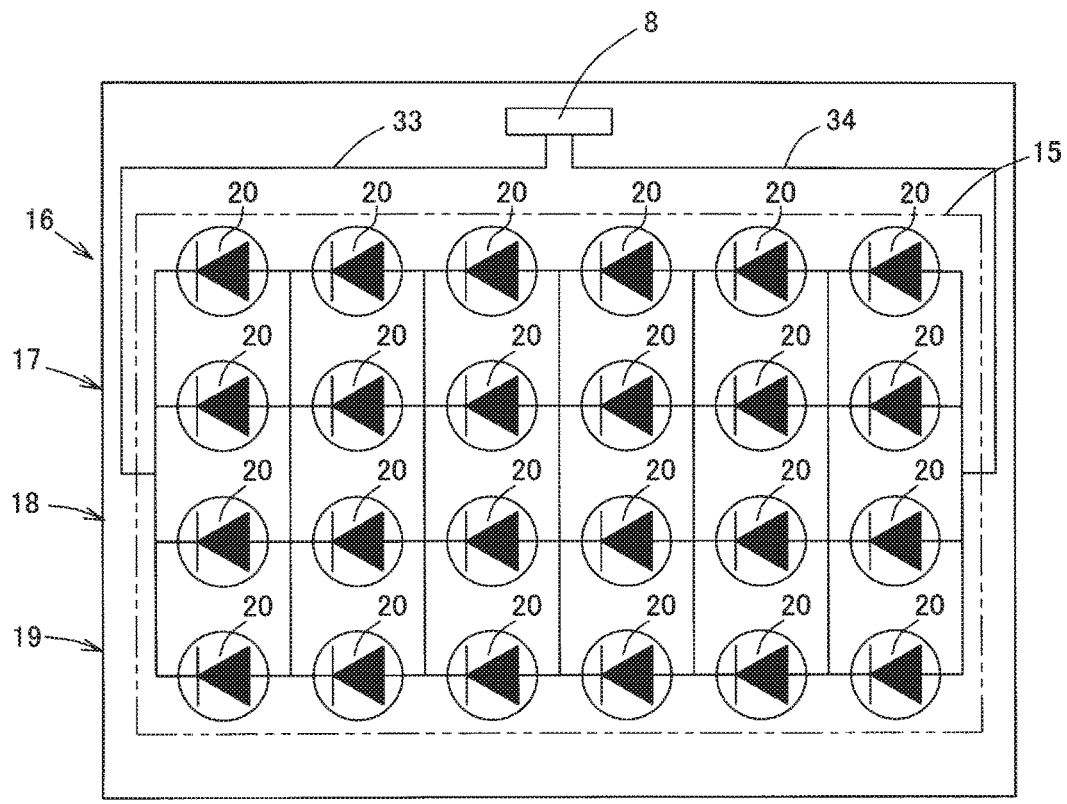
FIG. 10 is an electric circuit diagram of the solar cell module of FIG. 6.

In the power-generatable region 15, the individual solar cells 20 adjacent in the lateral direction X are connected in series to form the solar cell strings 16, 17, 18, and 19, as can be seen from FIGS. 8 and 10.

Further, paying attention to the longitudinal direction Y of the power-generatable region 15, the solar cell panel 5 includes the element separation groove 38 that separates both the photoelectric conversion layer 31 and the second electrode layer 32, as shown in FIG. 9B.

The element separation groove 38 is a groove that separates the photoelectric conversion element 25 into the plurality of solar cells 20. The element separation groove 38 is a groove having the first electrode layer 30 as a bottom part, and filled with the sealing member 28.

In solar cells 20c and 20d adjacent in the longitudinal direction Y, the first electrode layer 30c of one solar cell 20c and the first electrode layer 30d of the other solar cell 20d form a same electrode layer. That is, the solar cells 20c and 20d adjacent in the longitudinal direction Y are electrically connected in parallel by the first electrode layers 30c and 30d.

Further, as can be seen from FIGS. 8 and 10, the solar cell strings 16, 17, 18, and 19 adjacent in the longitudinal direction Y are connected in parallel via a common electrode layer 30.

Figure 11:
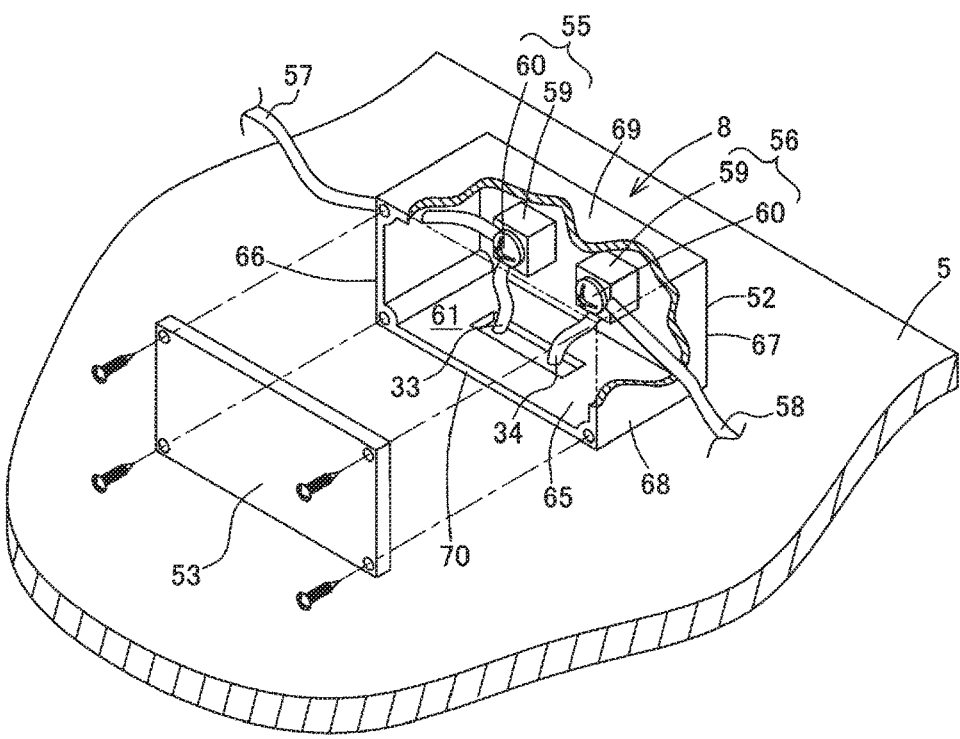
FIG. 11 is an exploded perspective view of a main part of the solar cell module of FIG. 6.

As can be seen from FIGS. 10 and 11, the solar cell panel 5 includes wiring members 33 and 34. The wiring members 33 and 34 are wiring lines electrically connected with the electrode layers 30 and 32 of the photoelectric conversion element 25 described above. That is, one wiring member 33 is a positive electrode wiring line while the other wiring member 34 is a negative electrode wiring line.

Figure 4:
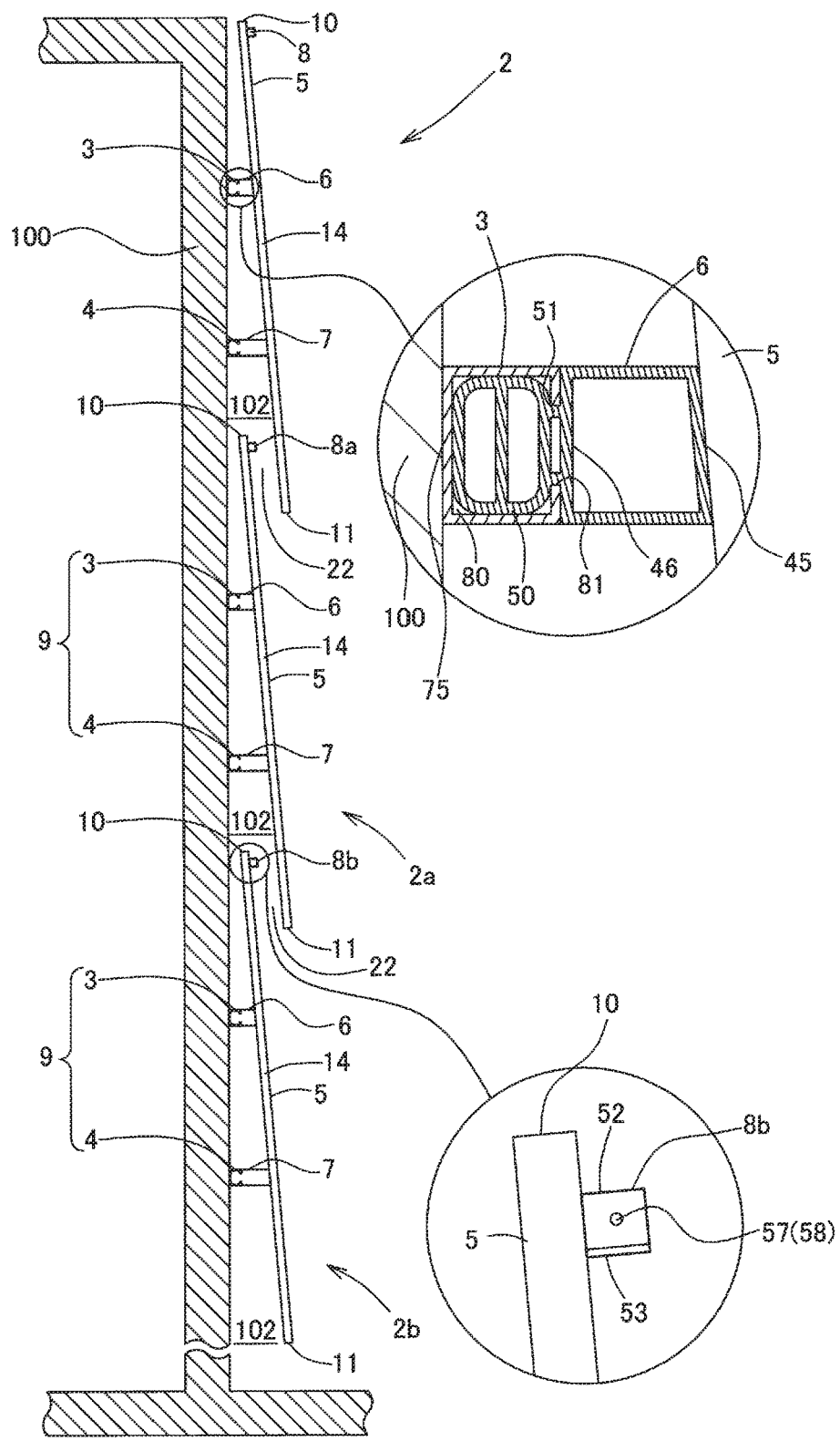
FIG. 4 is a sectional view of the solar cell module laying structure of FIG. 2.

As shown in FIG. 4, the connecting members 6 and 7 are members to connect the solar cell panel 5 to the pair of rail members 3 and 4.

Figure 12:
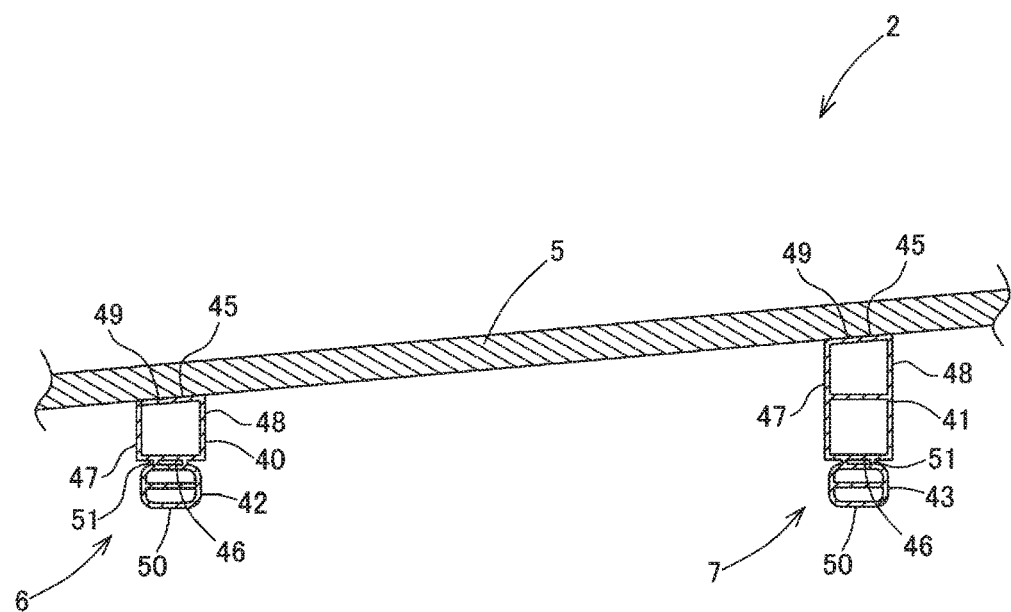
FIG. 12 is a sectional view of the solar cell module of FIG. 6.

As shown in FIG. 12, the connecting members 6 and 7 are formed by fixing parts 40 and 41 to fix to the solar cell panel 5, and engagement parts 42 and 43 to engage with the rail members 3 and 4.

The fixing parts 40 and 41 are parts having a trapezoidal cross section, and have a panel side wall part 45, a wall side wall part 46, and side wall parts 47 and 48 connecting the panel side wall part 45 and the wall side wall part 46.

The panel side wall part 45 is a wall part that inclines the solar cell panel 5 at a predetermined angle with respect to the wall surface 100. That is, the panel side wall part 45 includes an inclined surface 49 inclined at the predetermined angle with respect to the wall surface 100, and the inclined surface 49 is in surface contact with the back surface of the solar cell panel 5, enabling the solar cell panel 5 to be fixed in an inclined position with respect to the wall surface 100.

In the present embodiment, an inclination angle of the panel side wall part 45 with respect to the wall surface 100 is 3 degrees to 7 degrees when the laying structure 1 is assembled. That is, an inclination angle of the solar cell panel 5 with respect to the wall surface 100 is also 3 degrees to 7 degrees when the laying structure 1 is assembled.

As can be seen from FIGS. 4 and 12, the engagement parts 42 and 43 are parts engaged with the rail members 3 and 4, and include a main body 50, and a connecting unit 51 connecting the main body 50 and the wall side wall part 46.

A width of the connecting units 51 and 51 is smaller than a width of the main bodies 50 and 50, and smaller than a width of the fixing parts 40 and 41.

As shown in FIG. 11, the terminal box 8 is connected to the wiring members 33 and 34 of the solar cell panel 5, and externally takes out electricity generated in the solar cell panel 5.

The terminal box 8 includes a casing part 52, a lid part 53 (opening/closing member), mounting parts 55 and 56, and cable members 57 and 58.

The casing part 52 is a casing that has an opening in the surface direction (an extending direction) of the solar cell panel 5, and has a storage space 61 (an internal space) capable of internally housing the mounting parts 55 and 56 and a part of the cable members 57 and 58.

The casing part 52 is formed by a quadrangular bottom surface part 65, side wall parts 66, 67, and 68 erected from three sides of the bottom surface part 65, and a top surface part 69 opposing to the bottom part 65.

An inside and an outside of the storage space 61 communicate with each other via an opening 70 formed by the bottom surface part 65, the side wall parts 66, 67, and 68, and the top surface part 69.

The mounting parts 55 and 56 are parts provided inside the storage space 61 of the casing part 52, and for mounting the wiring members 33 and 34.

The mounting parts 55 and 56 each include a base 59 and a screw 60.

The base 59 is provided on the side wall part 67 opposed to the opening 70 of the casing part 52.

The cable members 57 and 58 are cables connected to the base 59 or the screw 60 and electrically connected to the corresponding wiring members 33 and 34 via the base 59 or the screw 60.

The cable members 57 and 58 are provided across the inside and the outside of the casing part 52, and partly protrudes from the casing part 52.

Further, in the cable members 57 and 58, a length of one cable member 57 is longer than a length of the other cable member 58.

The lid part 53 is a quadrangular lid to close the opening 70 of the casing part 52, and can be attached to and removed from the casing part 52 by a temporary fastening element. That is, the lid part 53 can open and close the opening 70.

The term "temporary fastening element" as used herein is a superordinate concept of a screw, a pin, and the like, and refers to a fastening element that can be attached and removed by satisfying a predetermined condition.

Figure 13:
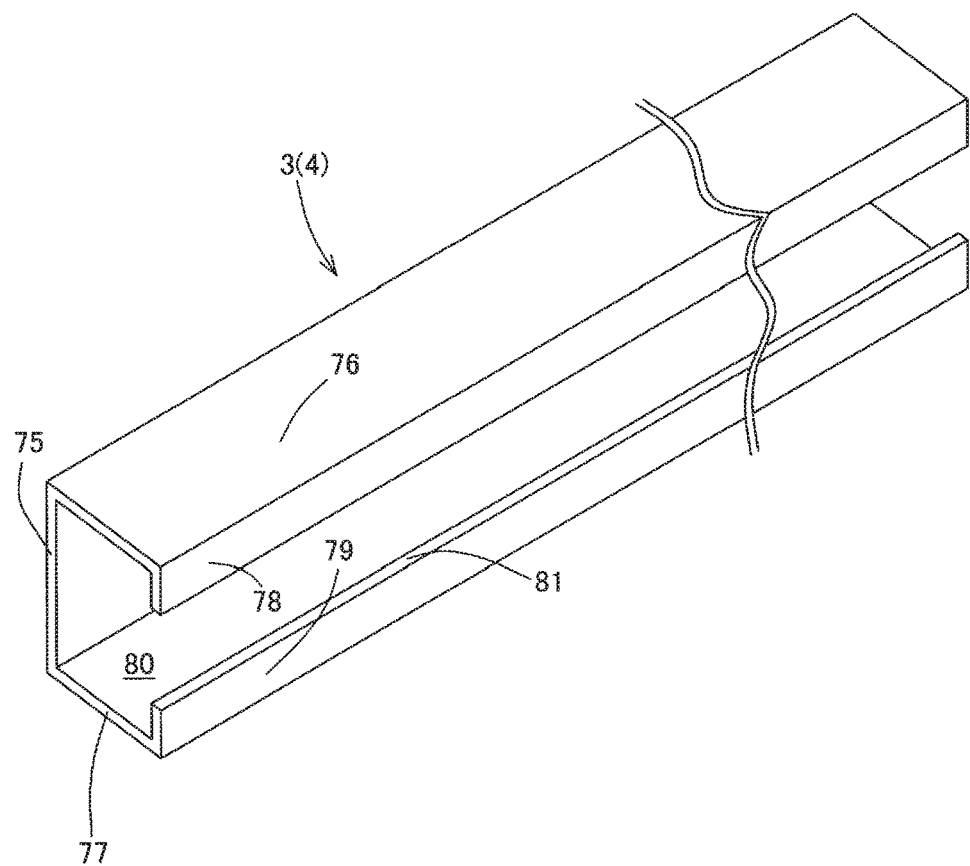
FIG. 13 is a perspective view of a rail member of FIG. 3.

As shown in FIG. 13, the rail members 3 and 4 (fixing members) are members having a substantially "C" sectional shape, and are rod-shaped members extending linearly in a predetermined direction.

The rail members 3 and 4 include a mounting wall part 75 to be attached to the wall surface 100, vertical wall parts 76 and 77 erecting from both ends of the mounting wall part 75, and locking wall parts 78 and 79 erecting from ends in an erecting direction of the vertical wall parts 76 and 77.

The vertical wall parts 76 and 77 are wall parts rising in a same direction from the ends of the mounting wall part 75.

The locking wall parts 78 and 79 are wall parts rising from the ends in a rising direction of the vertical wall parts 76 and 77, in a mutually approaching direction.

The rail members 3 and 4 have an enclosed space 80 surrounded by the mounting wall part 75, the vertical wall parts 76 and 77, and the locking wall parts 78 and 79. Viewed from another viewpoint, the locking wall parts 78 and 79 of the rail members 3 and 4 form a communication groove 81 that communicates the enclosed space 80 to the outside.

The communication groove 81 is a groove extending in a slit shape, and is a groove having end surfaces in a rising direction of the locking wall parts 78 and 79 as side walls.

Next, a positional relationship of individual component members of the laying structure 1 of the first embodiment will be described.

First, a positional relationship of individual component parts of the solar cell module 2 will be described.

Figure 5:
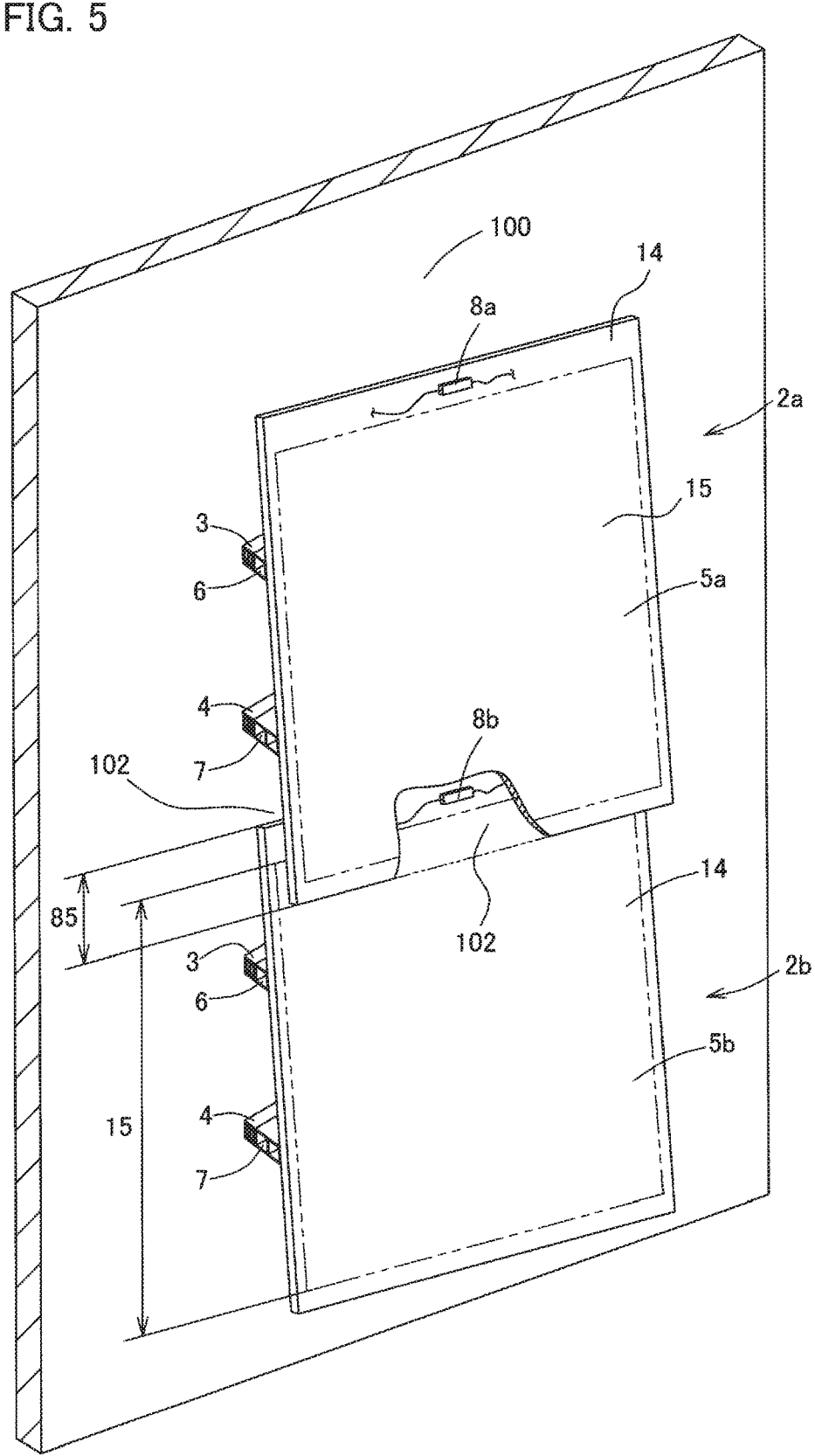
FIG. 5 is a sectional perspective view of a main part of the solar cell module laying structure of FIG. 2.

On a surface on the light receiving surface 14 side of the solar cell module 2, as can be seen from FIGS. 4 and 5, the terminal box 8 is provided closer to the upper side 10 while the power-generatable region 15 is provided closer to the lower side 11. Specifically, the terminal box 8 is provided on the light receiving surface 14 side of the solar cell module 2, and near an end on the upper side 10 side, while the power-generatable region 15 is provided to be shifted toward the lower side 11 side so as to avoid the terminal box 8. Further, the opening 70 of the terminal box 8 is directed in the surface direction of the solar cell panel 5 (an extending direction of the light receiving surface 14) and toward a center side of the solar cell panel 5. That is, the opening 70 of the terminal box 8 is directed in a direction crossing an orthogonal direction to the light receiving surface 14.

Figure 7:
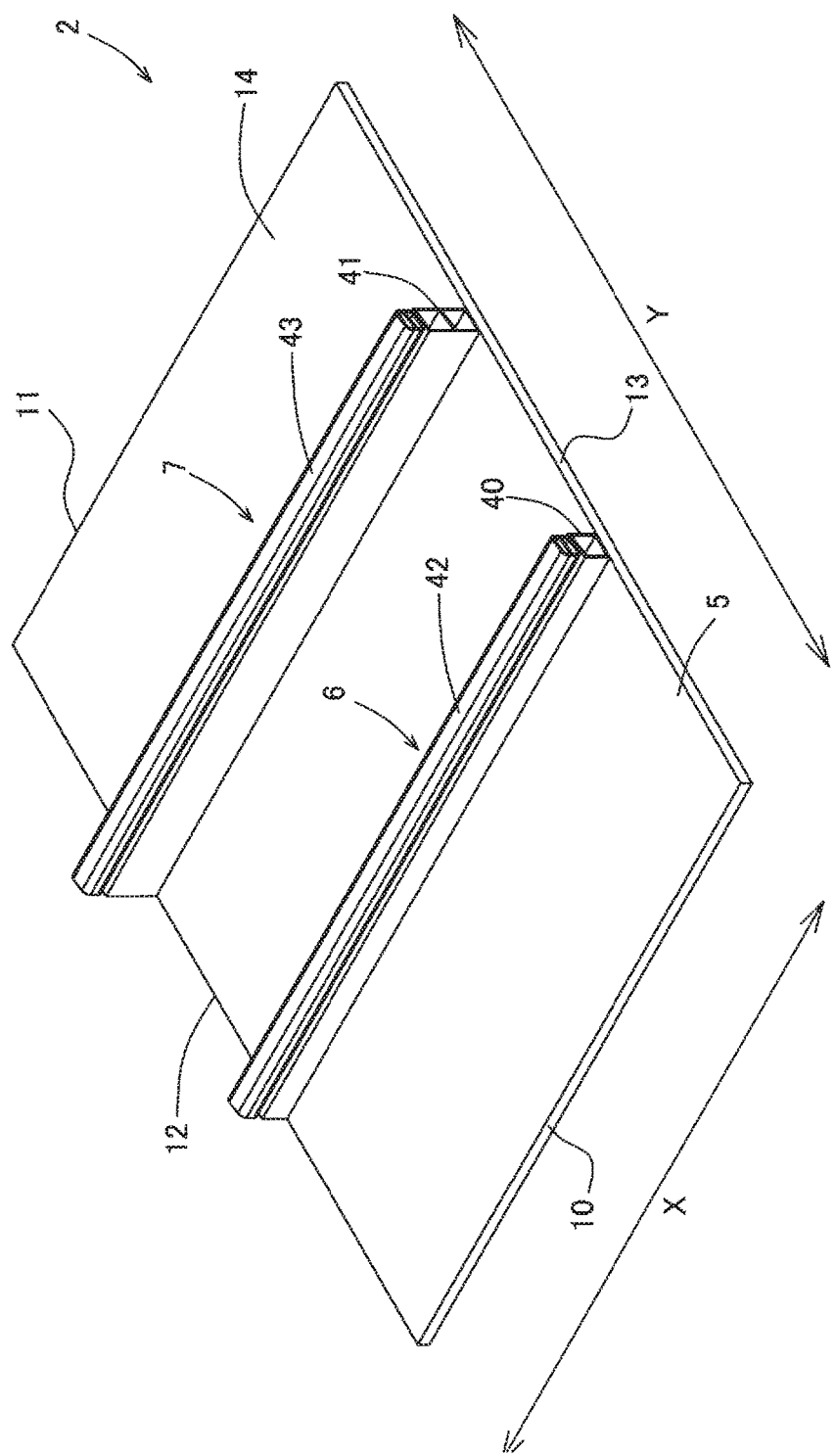
FIG. 7 is a perspective view of the solar cell module of FIG. 6 viewed from another direction.

The connecting members 6 and 7 are provided on the back surface of the solar cell panel 5 as shown in FIGS. 4 and 7. The connecting members 6 and 7 are aligned at a predetermined interval in the inclination direction, and are parallel to each other.

Specifically, the connecting members 6 and 7 are provided at a position away from the end of the solar cell panel 5, that is, in a middle portion in the inclination direction. In the present embodiment, the connecting members 6 and 7 are arranged with a center of the solar cell panel 5 interposed therebetween, and are provided in a range of ⅓ of the longitudinal sides 12 and 13 from the center of the solar cell panel 5. Further, the connecting members 6 and 7 are provided over the entire right-left direction (a direction orthogonal to the inclination direction and also orthogonal to the up-down direction).

Next, a positional relationship of individual component members will be described.

As shown in FIG. 5, in the laying structure 1, the rail members 3 and 4 are fixed to the wall surface 100, which is a vertical wall, and the connecting members 6 and 7 of the solar cell module 2 are fixed to the rail members 3 and 4.

Specifically, as shown in FIG. 4, in the rail members 3 and 4, the mounting wall parts 75 and 75 are mounted to the wall surface 100 by a fastening element (not shown), and the communication groove 81 is directed in an orthogonal direction to the wall surface 100.

A part of the engagement parts 42 and 43 of the solar cell module 2 is inserted into the enclosed spaces 80 and 80 of the rail members 3 and 4. Specifically, in the rail members 3 and 4, the main bodies 50 and 50 of the engagement parts 42 and 43 are disposed in the enclosed spaces 80 and 80, and the connecting units 51 and 51 are located in the communication grooves 81 and 81.

As shown in FIG. 4, a middle portion of the solar cell module 2 is supported by the rail members 3 and 4 and fixed in an inclined position. Both ends of the solar cell module 2 are free ends, and a space 102 is formed between the lower end of the solar cell module 2 and the wall surface 100.

In the laying structure 1, as shown in FIG. 5, the solar cell modules 2 are arranged side by side in the up-down direction.

Both of the solar cell modules 2a and 2b adjacent in the up-down direction are inclined with respect to the wall surface 100, and the solar cell modules 2a and 2b are substantially parallel to each other. That is, the inclination angle of the upper solar cell module 2a with respect to the wall surface 100 is substantially equal to the inclination angle of the lower solar cell module 2a with respect to the wall surface 100, and a difference is within ±3 degrees.

In the solar cell modules 2a and 2b adjacent in the up-down direction, a part of the lower solar cell module 2b is disposed in the space 102 between the upper solar cell module 2a and the wall surface 100, as can be seen from FIGS. 4 and 5. That is, when the wall surface 100 is viewed from the front, the solar cell modules 2a and 2b adjacent in the up-down direction partially overlap each other in a perpendicular direction with respect to the wall surface 100, to form an overlapping region 85. The end of the solar cell module 2a covers the power-generatable region 15 of the solar cell module 2b when viewed from the front.

The terminal box 8b of the lower solar cell module 2b is located in a gap 22 between the upper solar cell module 2a and the lower solar cell module 2b and in the overlapping region 85, which is an overlapping part. Further, a part of the power-generatable region 15 of the solar cell module 2b is also located in the overlapping region 85.

That is, the terminal box 8b of the lower solar cell module 2b is concealed by the upper solar cell module 2a, and cannot be visually recognized when viewed from the front. Further, in the solar cell strings 16, 17, 18, and 19 (see FIG. 10) located in the power-generatable region 15 of the solar cell module 2b, a part or all of at least one solar cell string 16 is located in the overlapping region 85. Moreover, the solar cell string 16 located in the overlapping region 85 and the solar cell strings 17, 18, and 19 located out of the overlapping region 85 are electrically connected in parallel.

As shown in an enlarged view of FIG. 4, the terminal box 8b of the solar cell module 2b is directed to a lower side in the inclination direction of the solar cell module 2b.

The lid part 53 of the terminal box 8b is located on the lower side in the inclination direction of the solar cell module 2b, and is externally exposed from the gap 22 between the solar cell panels 5a and 5b. That is, the lid part 53 of the terminal box 8b is externally exposed in the extending direction of the light receiving surface 14 of the solar cell module 2b.

Further, a gap is formed between the terminal box 8b of the solar cell module 2b and the solar cell module 2a.

Next, an installation method for the laying structure 1 according to one or more embodiments of the present invention will be described.

Figure 14A:
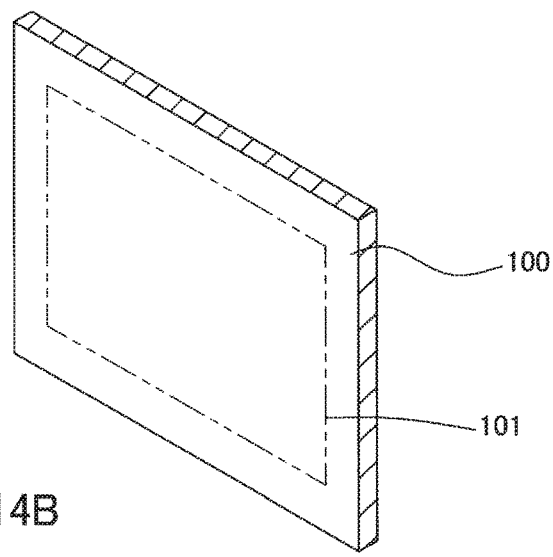

First, as shown in FIG. 14A, an installation region 101 where the solar cell module 2 is installed on the wall surface 100 is determined.

Figure 14B:
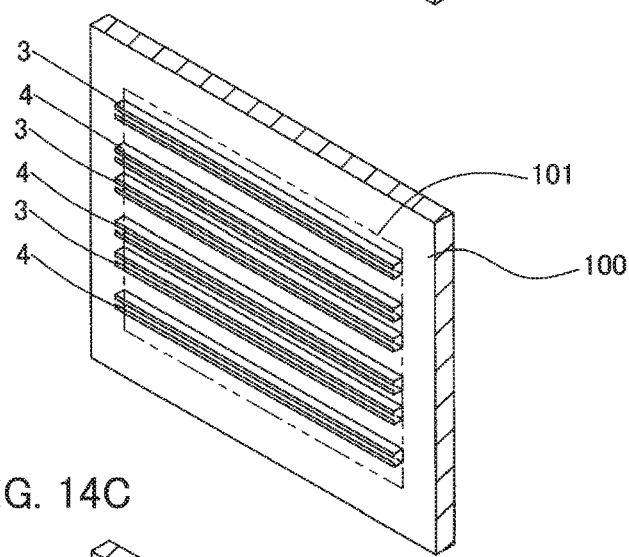

Next, as shown in FIG. 14B, the interval between the rail members 3 and 4 is adjusted according to the height of the installation region 101, and the rail members 3 and 4 are laid. Specifically, according to the height of the installation region 101, the position of the rail members 3 and 4 are adjusted such that a width W of the overlapping region 85 formed when the laying structure 1 is assembled is optimized For example, for decreasing the overlapped width W, an interval D between the rail groups 9 and 9 is widened as shown in FIG. 15A. Further, for example, for increasing the overlapped width W, the interval D between the rail groups 9 and 9 is narrowed as shown in FIG. 15B.

At this time, the rail members 3 and 4 forming the rail group 9 are arranged in parallel in the up-down direction, and are parallel to each other. In addition, the rail group 9 is arranged at an equal interval in the up-down direction.

Figure 14C:
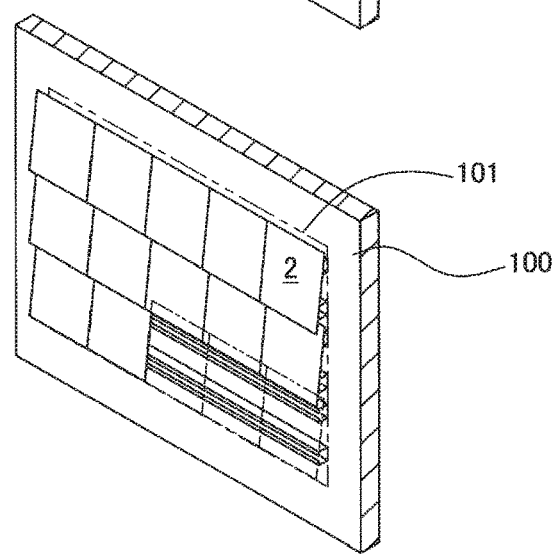

Subsequently, the engagement parts 42 and 43 of the connecting members 6 and 7 of the solar cell module 2 are inserted into the pair of rail members 3 and 4, and the solar cell module 2 is mounted. Specifically, as can be seen from FIGS. 3 and 14C, the solar cell module 2 is laid in the installation region 101 by sliding the solar cell module 2 along the communication groove 81 of the rail members 3 and 4, and the rail members 3 and 4 are engaged with the connecting members 6 and 7.

As described above, the solar cell modules 2 can be spread all over the predetermined installation region 101 in the up-down direction without any gap.

According to the laying structure 1 of the present embodiment, since the installation area of the solar cell modules 2 can be adjusted by adjusting the width W of the overlapping region 85 between the solar cell modules 2 and 2 adjacent in the up-down direction, the solar cell modules 2 can be arranged according to a limited range.

According to the laying structure 1 of the present embodiment, the solar cell strings 16, 17, 18, and 19 are arranged side by side in the inclination direction of the solar cell module 2, and are electrically connected in parallel. Therefore, even if a shadow caused by the presence of the upper solar cell module 2a is cast on a part of the power-generatable region 15, occurrence of a hot spot can be prevented.

According to the laying structure 1 of the present embodiment, the opening 70 of the terminal box 8 is directed in the inclination direction of the solar cell module 2, and the terminal box 8 is externally exposed between the solar cell panels 5a and 5b adjacent in the up-down direction. Therefore, by removing the lid part 53 of the terminal box 8 to open the opening 70, the opening 70 is externally exposed. Therefore, maintenance work can be performed without removing the solar cell module 2 from the rail members 3 and 4.

Next, a solar cell module laying structure of a second embodiment will be described. Note that similar reference numerals are given to similar configurations to those of the first embodiment, and the description thereof will be omitted.

In the solar cell module laying structure of the second embodiment, a structure of a solar cell module is different from that of the laying structure 1 of the first embodiment.

Figure 17:
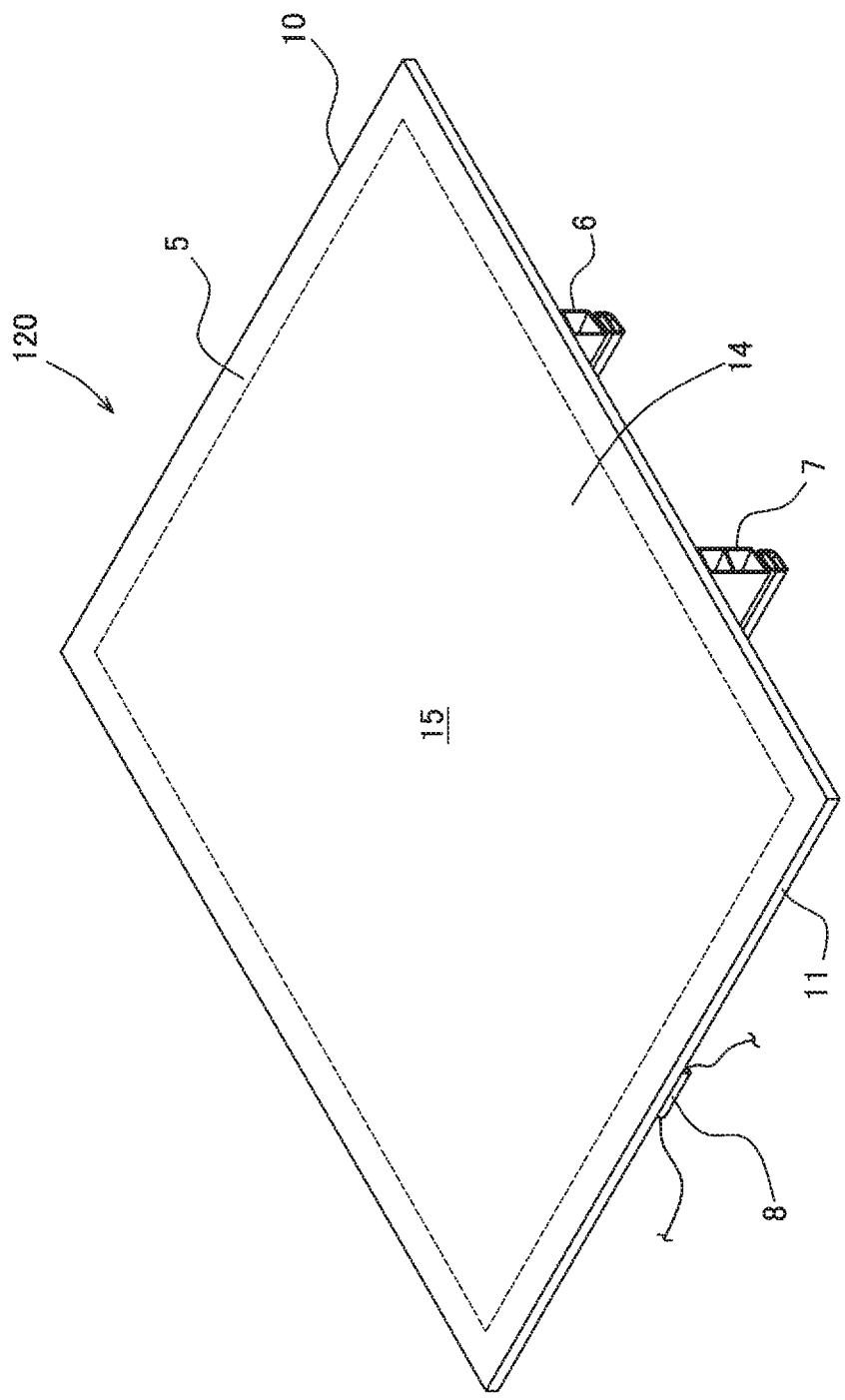
FIG. 17 is a perspective view of a solar cell module of FIG. 16.

In a solar cell module 120 of the second embodiment, as shown in FIG. 17, a terminal box 8 is provided on a rear side (a surface opposite to a surface on a light receiving surface 14 side) of a solar cell panel 5.

Figure 16:
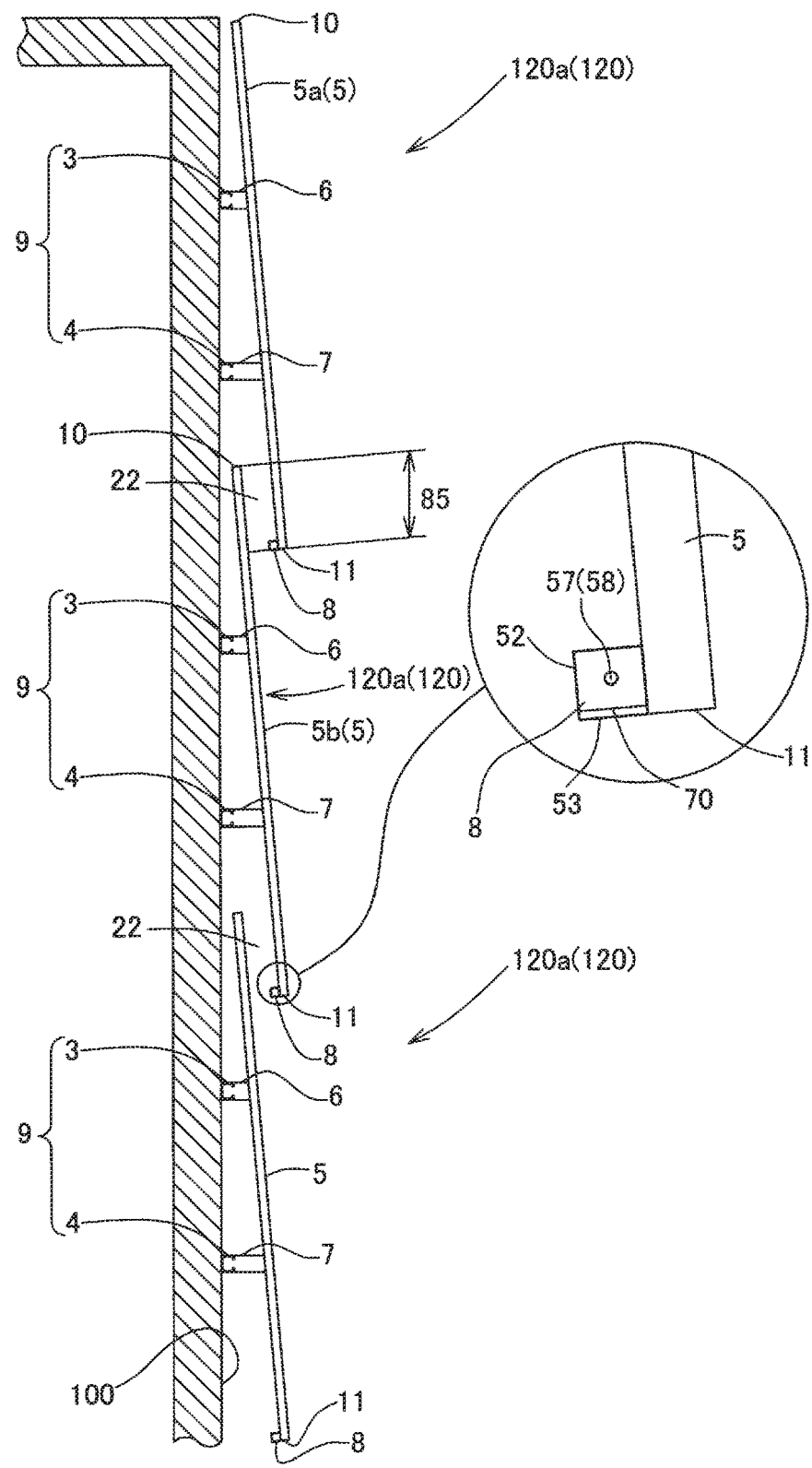
FIG. 16 is a sectional view of a solar cell module laying structure according to one or more embodiments of the present invention.

Specifically, as shown in FIG. 16, the terminal box 8 of the solar cell module 120 is provided closer to a lateral side 11 of the solar cell module 120. In the present embodiment, the terminal box 8 is provided at one end of the solar cell module 120.

An opening 70 of the terminal box 8 is directed in a surface direction of the solar cell module 120, and toward an outside of the solar cell panel 5.

In the solar cell module 120, a power-generatable region 15 is formed substantially over the entire surface.

A positional relationship of individual component members of the solar cell module laying structure of the second embodiment will be described.

In the solar cell module laying structure of the second embodiment, the solar cell modules 120 are arranged in parallel in the up-down direction as in the laying structure 1 of the first embodiment.

The solar cell modules 120a and 120b adjacent in the up-down direction overlap each other when viewed from the front, to form an overlapping region 85 as shown in FIG. 16.

The terminal box 8 is located in the overlapping region 85, and between the solar cell modules 120a and 120b. The terminal box 8 is provided on a lower side 11 side of the solar cell module 120a, and the opening 70 of the terminal box 8 is directed to the lower side in the inclination direction of the solar cell panel 5a.

According to the solar cell module laying structure of the second embodiment, the terminal box 8 is provided on the rear side of the solar cell module 120. Therefore, the power-generatable region 15 is not interfered by the terminal box 8, and the power-generatable region 15 can have a wide range.

Next, a solar cell module laying structure of a third embodiment will be described. Note that similar reference numerals are given to similar configurations to those of the first and second embodiments, and the description thereof will be omitted.

In the solar cell module laying structure of the third embodiment, a structure of a solar cell panel is different from that of the laying structure 1 of the first embodiment.

A solar cell panel 150 of the third embodiment is a crystalline solar cell panel.

A power-generatable region 15 of the solar cell panel 150 is shifted toward one lateral side 11 (a side opposite to the terminal box 8) of the solar cell panel 150.

Figure 18:
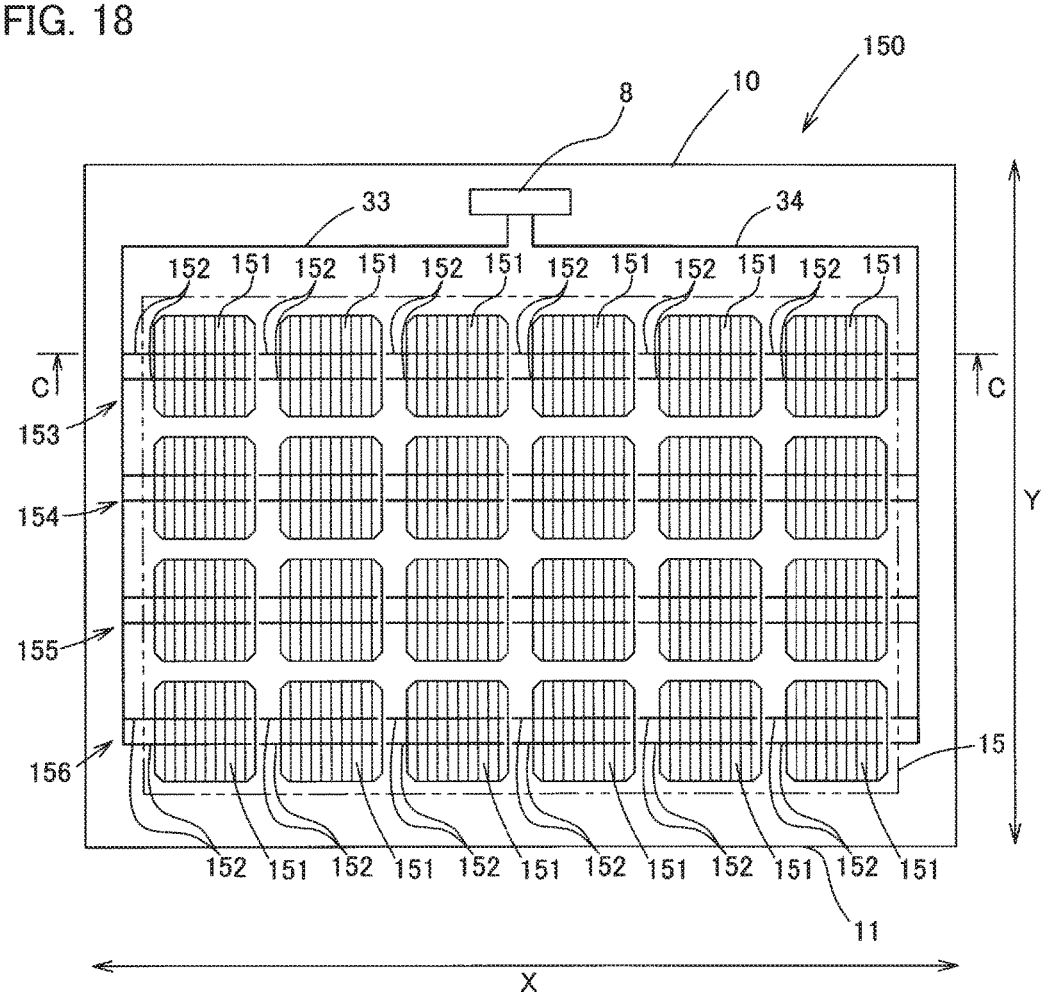
FIG. 18 is a plan view of a solar cell module according to one or more embodiments of the present invention.

As shown in FIG. 18, the power-generatable region 15 of the solar cell panel 150 includes solar cell strings 153, 154, 155, and 156 in which a plurality of solar cells 151 are connected via a wiring member 152.

Figure 19:
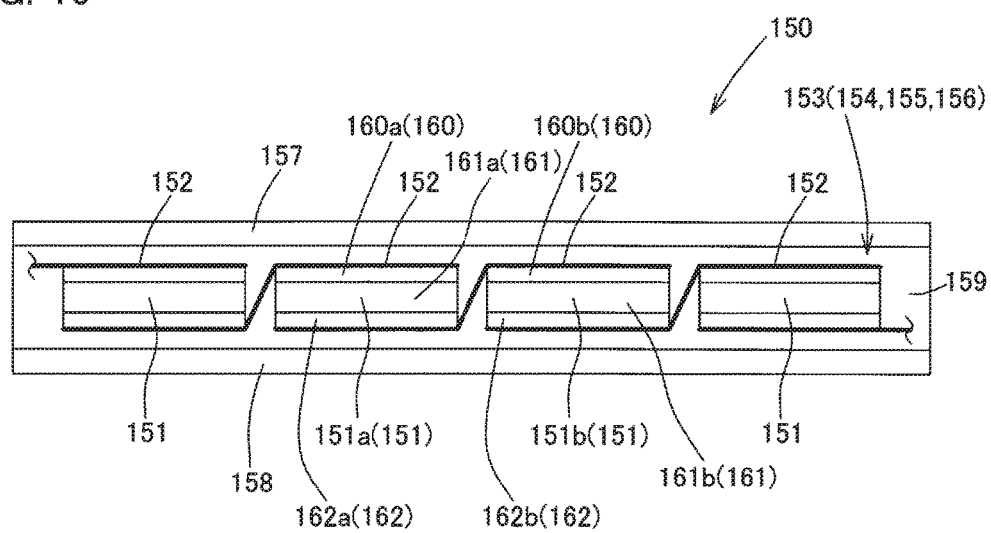
FIG. 19 is a C-C sectional view of the solar cell module of FIG. 18.

As shown in FIG. 19, the solar cell string 153 (154, 155, 156) is interposed between two glass substrates 157 and 158, and a gap between the glass substrates 157 and 158 is filled with a sealing member 159.

The solar cell 151 of the present embodiment is a crystalline silicon solar cell panel in which a silicon semiconductor layer is laminated on both surfaces of a silicon substrate. That is, the solar cell 151 is made by forming electrode layers 160 and 162 on both surfaces of a photoelectric conversion part 161 containing silicon as a main component.

The photoelectric conversion part 161 has at least a p-type semiconductor layer and an n-type semiconductor layer, and includes a PN junction or a PIN junction.

Paying attention to the lateral direction X of the power-generatable region 15, in the solar cell panel 150, the plurality of solar cells 151 are arranged side by side, and individual solar cells 151 are connected in series via the wiring member 152 to form the solar cell strings 153, 154, 155, and 156.

That is, as shown in FIG. 19, in the solar cells 151a and 151b adjacent in the lateral direction X, a second electrode layer 162a of one solar cell 151a is electrically connected to a first electrode layer 160b of the other solar cell 15 lb. In other words, the solar cells 151a and 151b adjacent in the lateral direction X are electrically connected in series.

Figure 20:
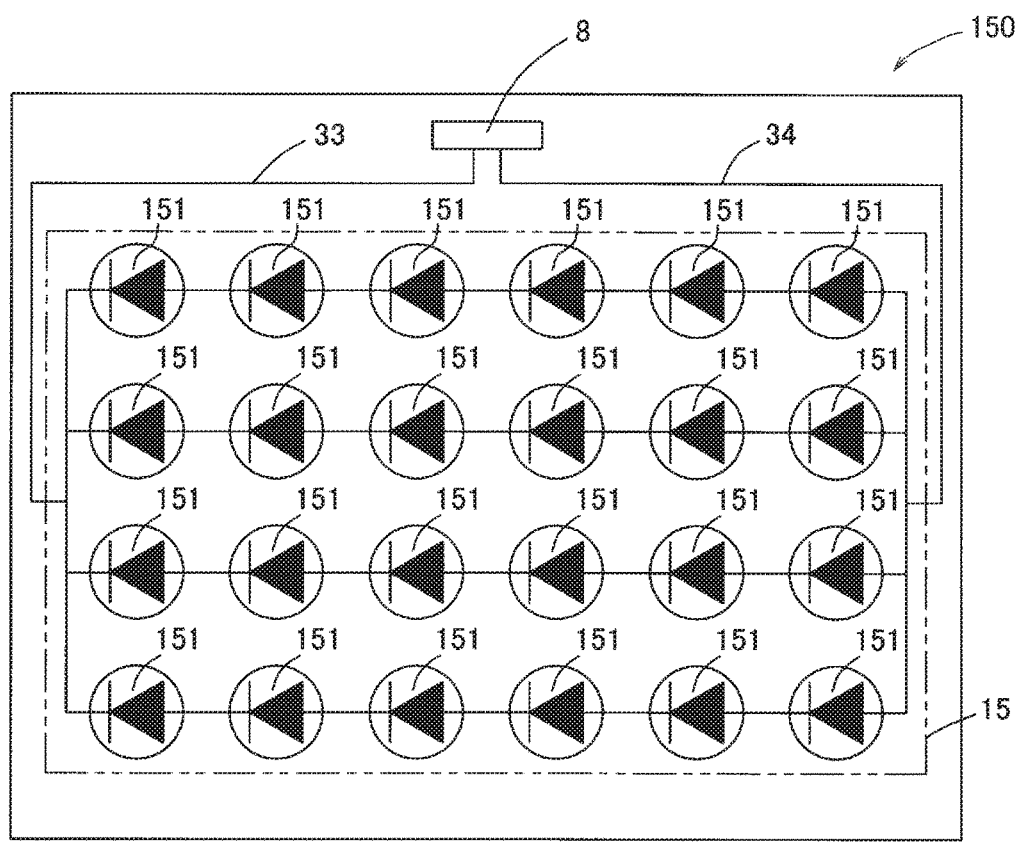
FIG. 20 is an electric circuit diagram of the solar cell module of FIG. 19.

Paying attention to the longitudinal direction Y of the power-generatable region 15, each end of the solar cell strings 153, 154, 155, and 156 is connected to wiring members 33 and 34 via the wiring member 152, as shown in FIG. 18. That is, as shown in FIG. 20, the solar cell strings 153, 154, 155, and 156 adjacent in the longitudinal direction Y are electrically connected in parallel.

According to the solar cell module laying structure of the third embodiment, since the crystalline solar cell panel 150 is implemented, the power generation efficiency is high as compared with a case of implementing a thin film solar cell panel.

In the above-described embodiment, one solar cell module 2a in the adjacent solar cell modules 2a and 2b covers the power-generatable region 15 of another solar cell module 2b, but one or more embodiments of the present invention are not limited to this. For example, it is not necessary to cover the power-generatable region 15 of the another solar cell module 2b with the one solar cell module 2a.

Figure 21:
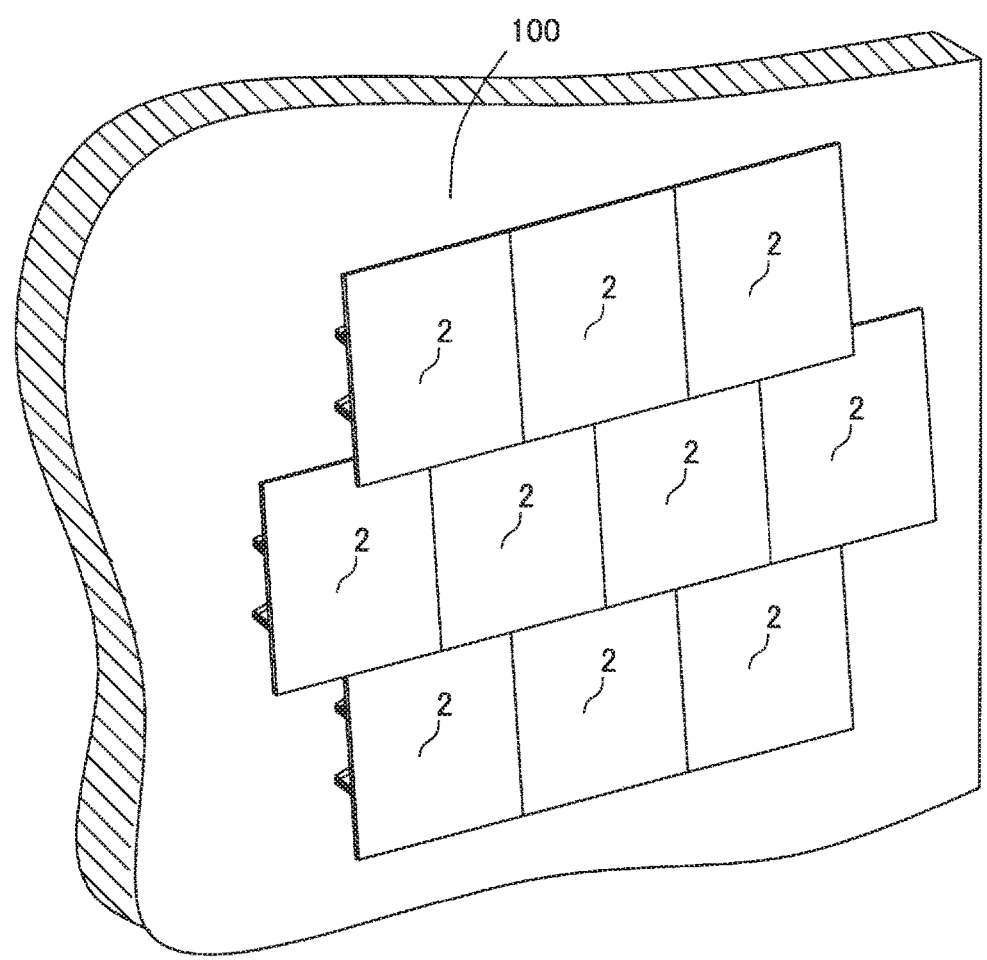
FIG. 21 is a perspective view of a solar cell module laying structure according to one or more embodiments of the present invention.

In the above-described embodiment, the solar cell modules 2 are aligned linearly in the up-down direction, but one or more embodiments of the present invention are not limited to this. The solar cell modules adjacent in the up-down direction may be displaced in the right-left direction. For example, as shown in FIG. 21, the lower or upper solar cell module 2 may be arranged so as to straddle between the solar cell modules 2 and 2 adjacent in the right-left direction.

Figure 22:
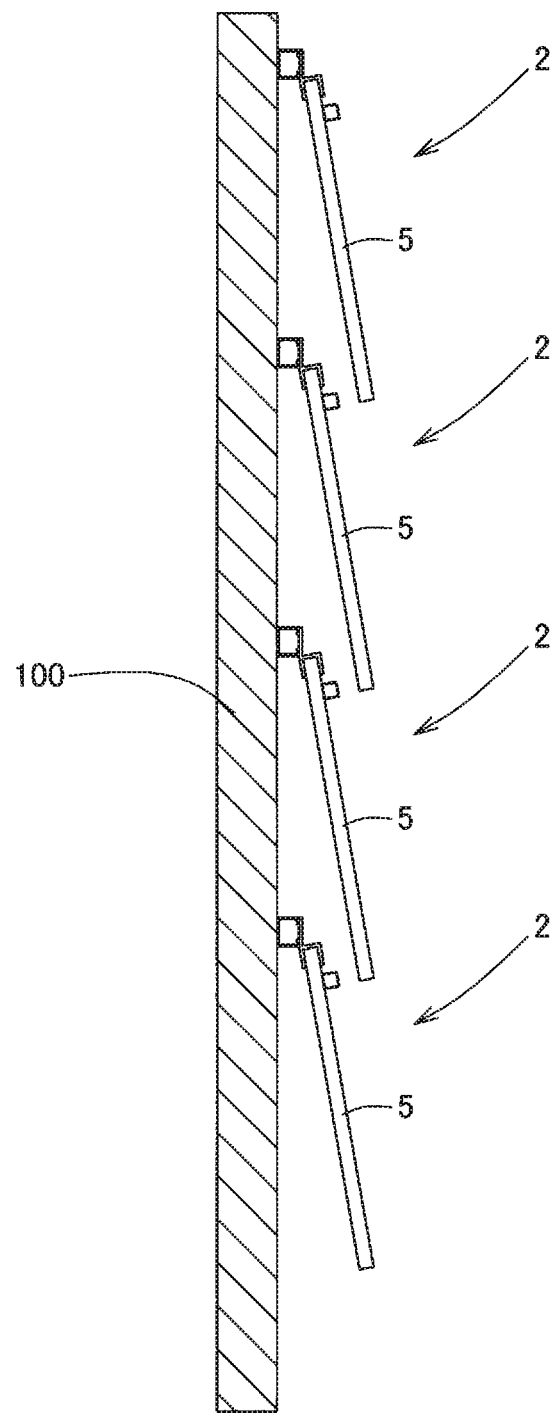
FIG. 22 is a sectional view of a solar cell module laying structure according to one or more embodiments of the present invention.

In the above-described embodiment, the center of the solar cell module 2 is supported by the rail members 3 and 4, so that both ends of the solar cell module 2 are free ends. However, one or more embodiments of the present invention are not limited to this. It is sufficient that at least one side end of the solar cell module 2 is a free end. For example, as shown in FIG. 22, the solar cell module 2 may be supported in a cantilever manner.

Figure 23:
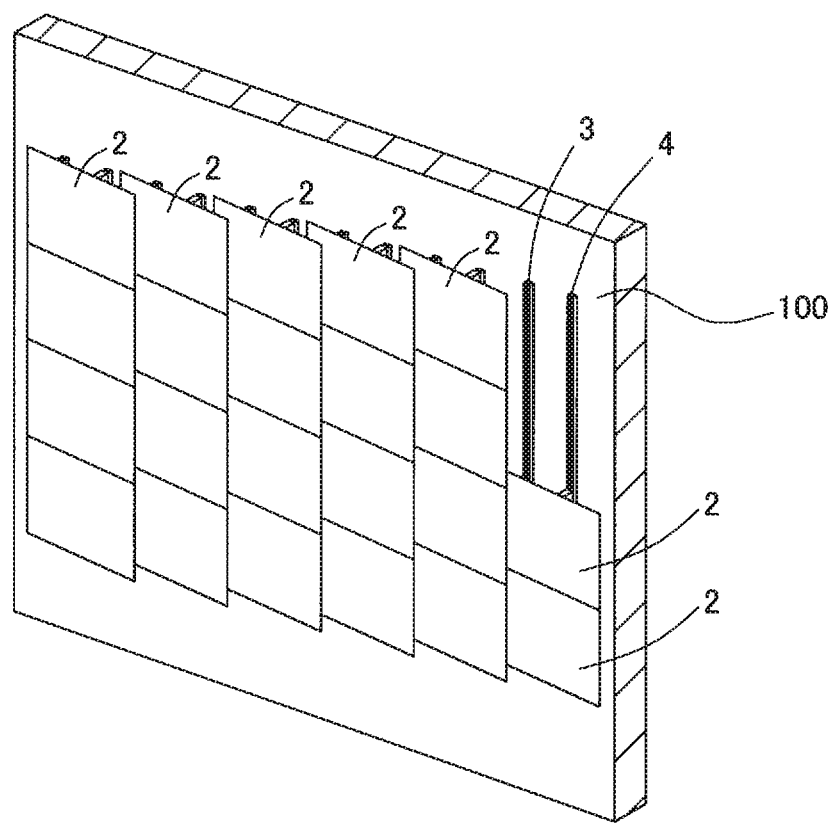
FIG. 23 is a perspective view of a solar cell module laying structure according to one or more embodiments of the present invention.

In the above-described embodiment, there is formed the overlapping region 85, which is the overlapping part, between the solar cell modules 2 and 2 adjacent in the up-down direction, but one or more embodiments of the present invention are not limited to this. For example, as shown in FIG. 23, the overlapping region may be formed between the solar cell modules 2 and 2 adjacent in the right-left direction.

In this case, it may be that the width of the overlapping region between the solar cell modules 2 and 2 adjacent in the right-left direction is adjusted based on the width of the installation region 101, and the rail members 3 and 4 are laid.

In the above-described embodiment, the terminal box 8 is disposed in the gap 22 between the upper solar cell panel 5 and the lower solar cell panel 5, and is externally exposed from the gap 22. However, one or more embodiments of the present invention are not limited to this.

Figure 24:
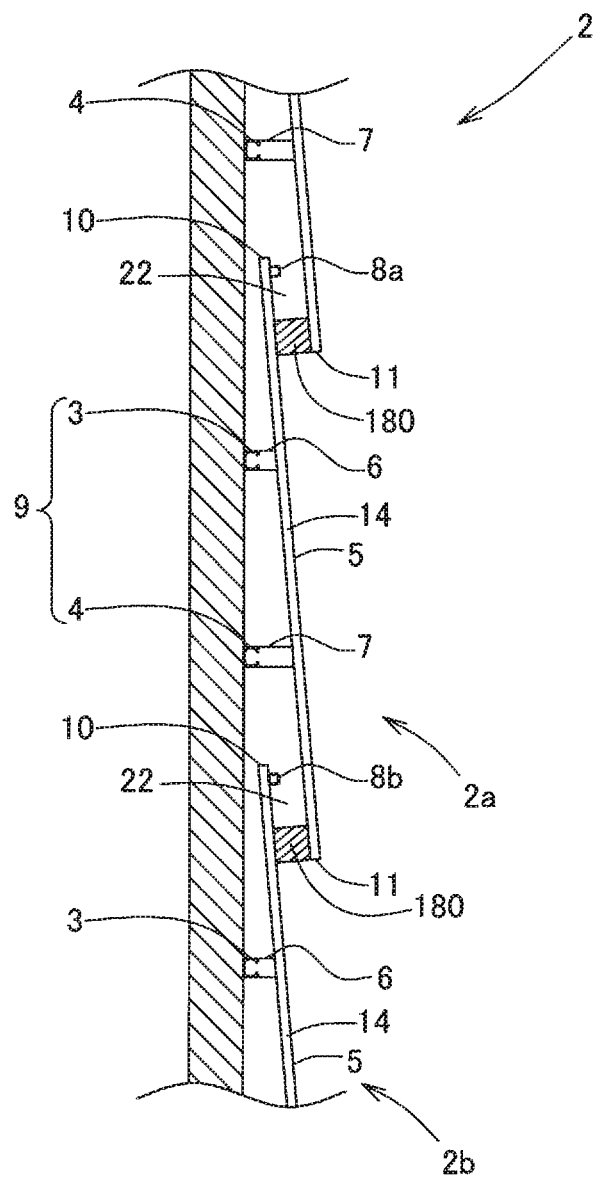
FIG. 24 is a sectional view of a solar cell module laying structure according to one or more embodiments of the present invention.

For example, as shown in FIG. 24, there may be provided with a decorative member 180 (another member) that can be attached to and removed from the gap 22, in a part of the gap 22 between the upper solar cell panel 5 and the lower solar cell panel 5, to block the part of the gap 22. This causes the terminal box 8 to be invisible from the extending direction of the light receiving surface 14 of the solar cell panel 5, providing higher design characteristic. When maintenance or the like is performed, removing the decorative member 180 from the gap 22 causes the terminal box 8 to be externally exposed from the gap 22, enabling maintenance work in the installed state.

In the above-described embodiment, a case of the wall surface 100 of the building has been described as an example of an installation place, but one or more embodiments of the present invention are not limited to this. For example, the solar cell module 2 may be laid on a wall surface of a house, a wall surface of a veranda or balcony, or the like.

In the first embodiment described above, the element separation groove 38 is formed to have a depth such that the first electrode layer 30 remains at the bottom part, and the solar cells 20 and 20 adjacent in the longitudinal direction are electrically connected by using the first electrode layer 30. However, one or more embodiments of the present invention are not limited to this. A design of the element separation groove 38 is not particularly limited.

Figure 25A:
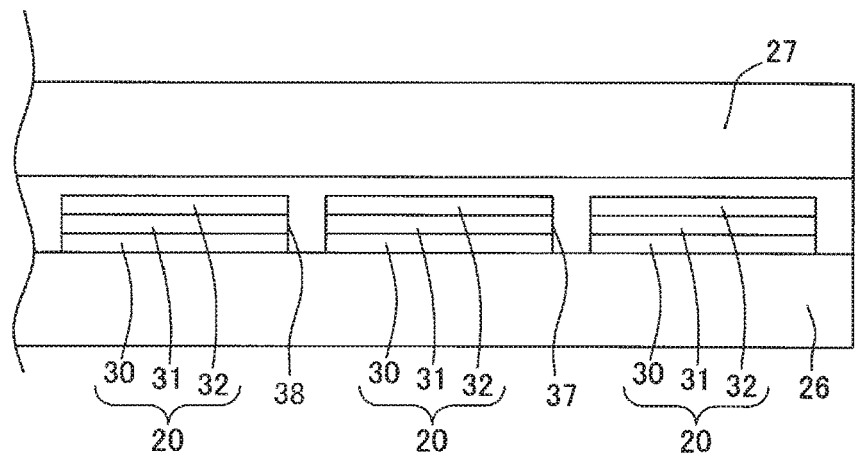

For example, as shown in FIG. 25A, the element separation groove 38 may have a depth reaching the glass substrate 26, to electrically insulate the solar cells 20 and 20 adjacent in the longitudinal direction.

Figure 25B:
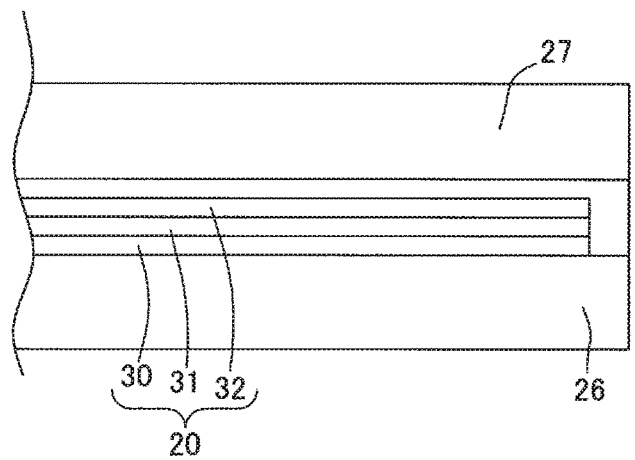

Further, for example, as shown in FIG. 25B, it is not necessary to form the element separation groove 38.

Figure 25C:
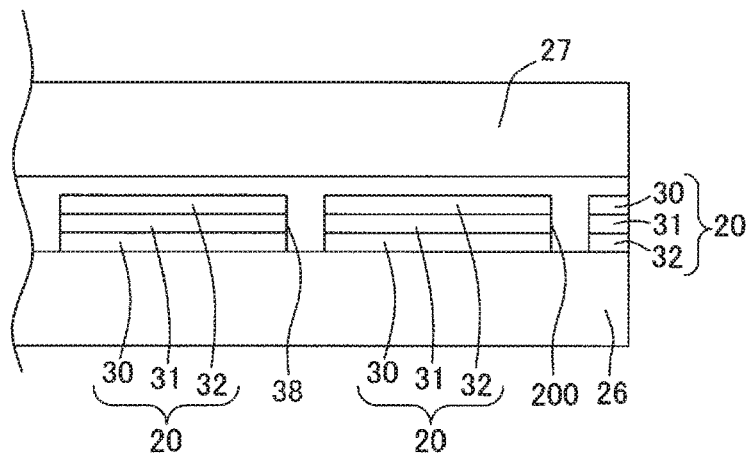

In the first embodiment described above, the solar cell 20 does not reach the end of the glass substrate 26, and there is formed a region not formed with the solar cell 20 at the end of the glass substrate 26. However, one or more embodiments of the present invention are not limited to this. As shown in FIG. 25C, the solar cell 20 may reach the end of the glass substrate 26, and there may be formed an insulating groove 200 where the solar cell 20 is removed near the end of the glass substrate 26.

In the above-described embodiment, a case has been described in which the wall surface 100 is a vertical wall rising in the vertical direction, but one or more embodiments of the present invention are not limited to this. It is sufficient that the wall surface 100 rises in a substantially vertical direction, and it may be slightly inclined with respect to the vertical direction.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCE SIGNS

1: solar cell module laying structure
2, 120: solar cell module
2a: one solar cell module
2b: another solar cell module 3, 4: rail member (fixing member)
8: terminal box
10: upper side
11: lower side
15: power-generatable region
16 to 19, 153 to 156: solar cell string (solar cell group)
20: solar cell
22: gap
30, 160: first electrode layer (electrode layer)
31: photoelectric conversion layer (photoelectric conversion part)
32, 162: second electrode layer (electrode layer)
52: casing part (casing)
53: lid part (opening/closing member)
57, 58: cable member
61: storage space (internal space)
70: opening
85: overlapping region (overlapping part)
100: wall surface
161: photoelectric conversion part
180: decorative member (another member)

The invention claimed is:

1. A solar cell module laying system configured to lay a plurality of solar cell modules on a wall surface rising in a substantially vertical direction,
   wherein the plurality of solar cell modules includes a first solar cell module and a second solar cell module adjacent to each other in an up-down direction, and the first and second solar cell modules overlap with each other to form an overlapping region,
   wherein each of the solar cell modules has a terminal box, most of the terminal box being disposed in the overlapping region and in a gap between the first and second solar cell modules,
   wherein the solar cell module laying system further comprises a fixing member that fixes the solar cell modules to the wall surface,
   wherein a middle portion of the first and second solar cell modules is supported by the fixing member and fixed in an inclined position,
   wherein both ends of the first and second solar cell modules in the inclined position are free ends,
   wherein a part of the second solar cell module enters between the free end of the first solar cell and the wall surface to form the overlapping region, and
   wherein a condition (1) or (2) below is satisfied:
   (1) a part of the terminal box is exposed toward an outside of the gap, and
   (2) a part of the gap is blocked by a member that is attachable to and detachable from the gap, the part of the terminal box being exposed toward the outside of the gap when the member is detached from the gap.

2. The solar cell module laying system according to claim 1, wherein the first and second solar cell modules are inclined with respect to the wall surface and overlap with each other when the wall surface is viewed from front.

3. The solar cell module laying system according to claim 2,
   wherein each of the solar cell modules has an upper side and a lower side opposing to each other, and
   wherein a region along a lower side of the first solar cell module overlaps with a region along an upper side of the second solar cell module.

4. The solar cell module laying system according to claim 1,
   wherein each of the solar cell modules has a power-generatable region capable of converting light energy into electric energy, and
   wherein the first solar cell module overlaps with a power-generatable region of the second solar cell module located nearer the wall surface than the first solar cell module.

5. The solar cell module laying system according to claim 4,
   wherein each of the solar cell modules comprises a plurality of solar cell groups each including one or more solar cells that are electrically connected in series in the power-generatable region,
   wherein a plurality of solar cell groups of the second solar cell module includes: a first solar cell group located in the overlapping region; and a second solar cell group composed of a solar cell group other than the first solar cell group, and
   wherein the second solar cell module electrically connects the first solar cell group to the second solar cell group in parallel.

6. The solar cell module laying system according to claim 5,
   wherein each of the solar cells includes two electrode layers and a photoelectric conversion part interposed between the two electrode layers,
   wherein the solar cell group includes a first solar cell group located in the overlapping region and a second solar cell group composed of the other solar cell group, and
   wherein the first solar cell group is electrically connected in parallel to the second solar cell group via a common electrode layer.

7. The solar cell module laying system according to claim 4,
   wherein each of the solar cell modules comprises a solar cell group including a plurality of solar cells that are electrically connected in series in the power-generatable region,
   wherein each of the solar cells includes two electrode layers and a photoelectric conversion part interposed between the two electrode layers, and
   wherein an electrode layer of one of the solar cells is electrically connected in series with another of the solar cells through direct contact with an electrode layer of another of the solar cells.

8. The solar cell module laying system according to claim 1,
   wherein the first and second solar cell modules are inclined with respect to the wall surface,
   wherein the terminal box has a casing and a cable member,
   wherein the casing comprises: an opening that communicates an internal space of the casing with an outside; and an opening/closing member that can open and close the opening,
   wherein the opening is directed in an inclination direction of one of the first and second solar cell modules, and
   wherein a part of the cable member is housed in the internal space of the casing and is exposed toward the outside of the opening when the opening is opened.

9. The solar cell module laying system according to claim 1,
   wherein each of the solar cell modules has a lower side, and has a power-generatable region capable of converting light energy into electric energy, and wherein the second solar cell module with the overlapping region nearer the wall surface than the first solar cell module has the power-generatable region arranged in a position shifted toward the lower side to avoid an arrangement onto the overlapping region.

10. A first solar cell module that is fixed to be inclined with respect to a wall surface rising in a substantially vertical direction, and that has an overlapping region with an adjacent second solar cell module fixed at a similar incline with respect to the wall surface, the first and second solar cell modules comprising: a light receiving surface; and a terminal box, wherein most of the terminal box is disposed in a gap formed between the first solar cell module and the second solar cell module in the overlapping region, wherein the terminal box includes a casing and a cable member, wherein the casing includes: an opening that communicates an internal space of the casing with an outside; and an opening/closing member that can open and close the opening, wherein the opening is directed in a direction crossing an orthogonal direction to the light receiving surface, and wherein a part of the cable member is housed in the internal space of the casing, the cable member being exposed to an outside of the opening when the opening is opened.

11. The solar cell module according to claim 10, wherein the opening is directed in the inclination direction.

12. A solar cell module laying method for laying a plurality of solar cell modules in a predetermined area with a fixing member that fixes the solar cell modules to a wall surface rising in a substantially vertical direction and for arranging the solar cell modules side by side with an overlapping region between two adjacently arranged solar cell modules, the plurality of solar cell modules includes a first solar cell module and a second solar cell module adjacent to each other in the up-down direction, the solar cell module laying method comprising:

fixing the first and second solar cell modules by supporting a middle portion of the first and second solar cell modules by the fixing member so that both ends of the first and second solar cell modules are free ends, and a part of the second solar cell module enters between the free end of the first solar cell and the wall surface to form the overlapping region, and adjusting a width of the overlapping region based on a width or a height of the predetermined area of the wall surface by adjusting the interval of the fixing member to lay each of the plurality of solar cell modules in an entire area of the predetermined area.

13. The solar cell module laying method according to claim 12, wherein adjusting the width of the overlapping region is performed by adjusting the width of the overlapping region based on the height of the predetermined area of the wall surface.

* * * * *